United States Patent [19]

Glaise et al.

[11] Patent Number: 5,043,937
[45] Date of Patent: Aug. 27, 1991

[54] EFFICIENT INTERFACE FOR THE MAIN STORE OF A DATA PROCESSING SYSTEM

[75] Inventors: Rene Glaise, Nice; Yves Hartmann, Vence; Pierre Huon, Saint Laurent Du Var; Michel Peyronnenc, Saint Jeannet, all of France

[73] Assignee: International Business Machines Corporation, Armonk, N.Y.

[21] Appl. No.: 285,675

[22] Filed: Dec. 16, 1988

[30] Foreign Application Priority Data

Dec. 23, 1987 [EP] European Pat. Off. ......... 87480027

[51] Int. Cl.<sup>5</sup> ............................................. G06F 1/00
[52] U.S. Cl. .................................... 364/900; 364/200
[58] Field of Search ... 364/200 MS File, 900 MS File

[56] References Cited

U.S. PATENT DOCUMENTS

| 3,925,766 | 12/1975 | Bardotti et al. | 364/200 |
| 4,028,663 | 6/1977 | Royer et al. | 364/900 |
| 4,080,652 | 3/1978 | Cronshaw et al. | 364/200 |
| 4,330,844 | 5/1982 | Dubuc | 364/900 |
| 4,453,214 | 6/1984 | Adcock | 364/200 |
| 4,607,348 | 8/1986 | Sheth | 364/900 |

Primary Examiner—Douglas W. Olms
Assistant Examiner—T. Samuel
Attorney, Agent, or Firm—Edward H. Duffield

[57] ABSTRACT

A memory interface mechanism is driven from the memory controller side which comprises lines which are shared by the memory user devices and lines which are specific to the memory user devices. The shared lines are the address and data bus lines the byte select lines, the data and address clock lines and the last operation line. The specific lines are the request lines, the address user indicator lines and data user indicator lines. A user initiates a memory operation by activating its request line and then waits for the activation by the memory interface control circuit for the activation of the address and data user indicator lines. The user controls the address and data transfer count and ends the transfer by activating the last operation line. Then it waits for the deactivation by the memory controller of the address and data user indicator lines to present a new request, if any. Thus the memory transfer is memory driven which allows full advantage to be taken of a page mode facility of the memory. The memory operations may be pipelined since servicing a request from a user may be started before servicing the request from the previous selected user is ended.

10 Claims, 21 Drawing Sheets

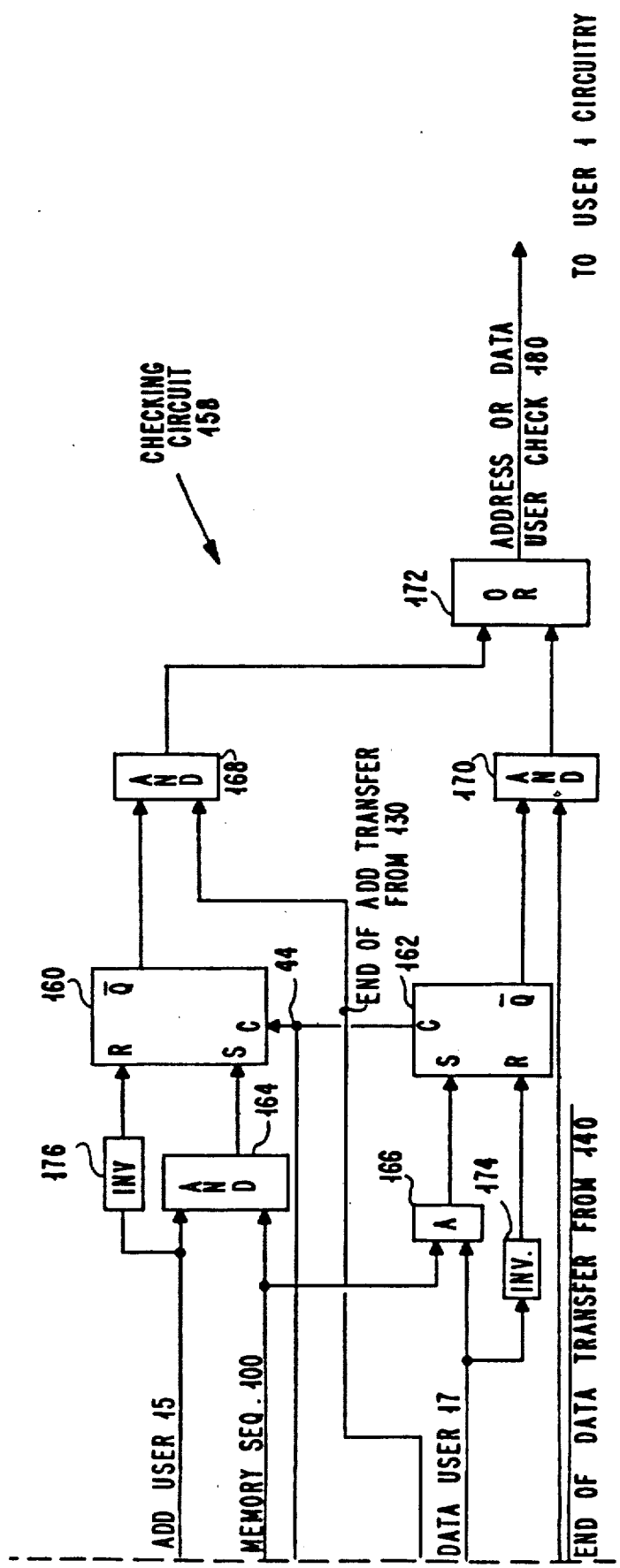

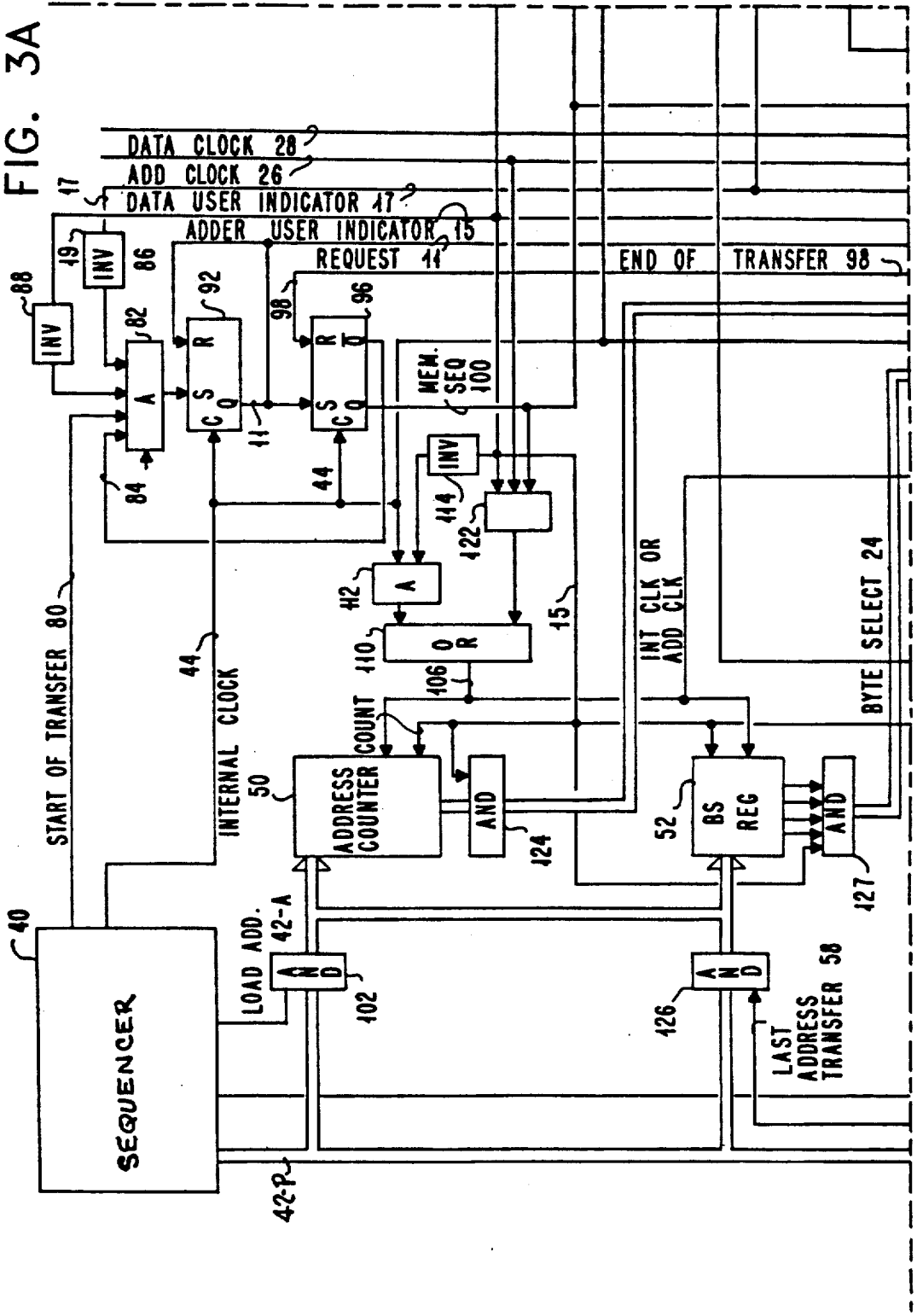

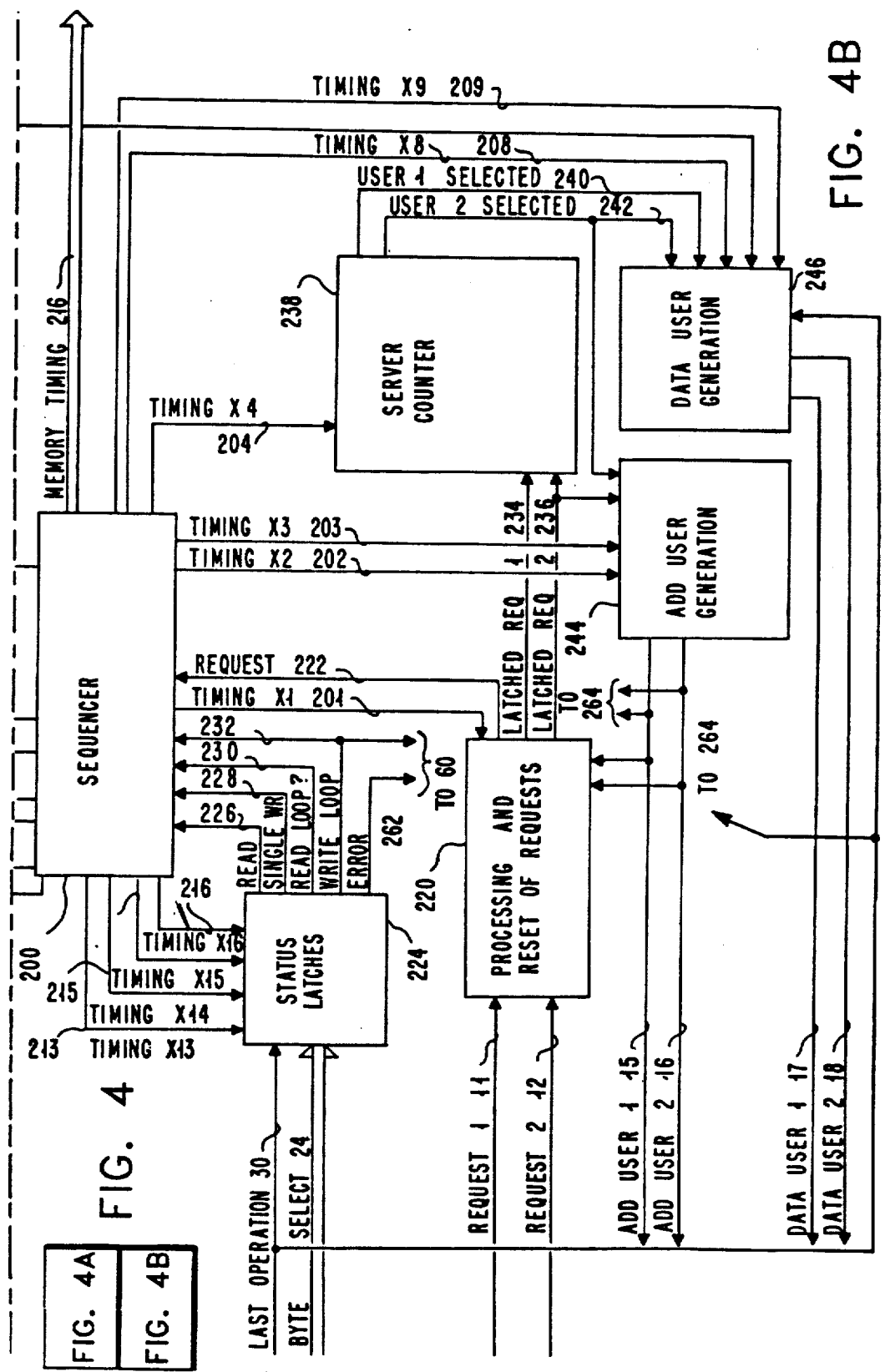

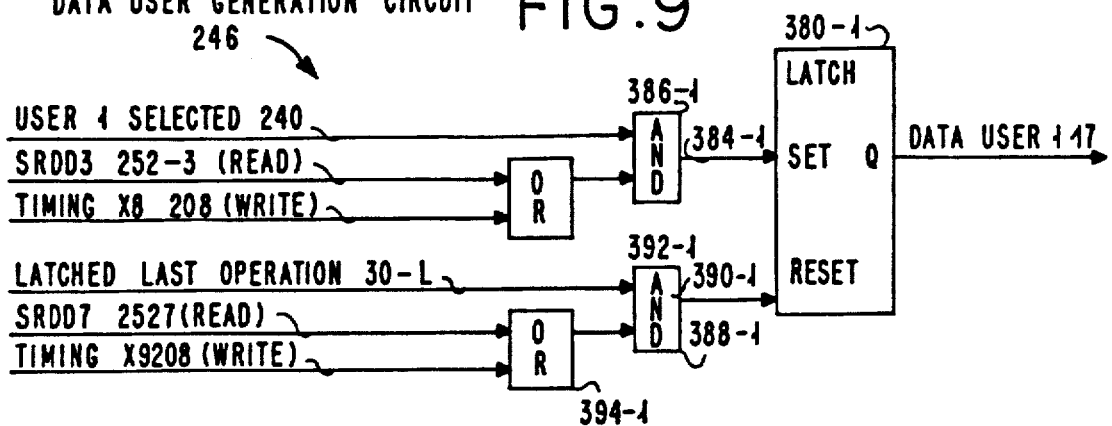
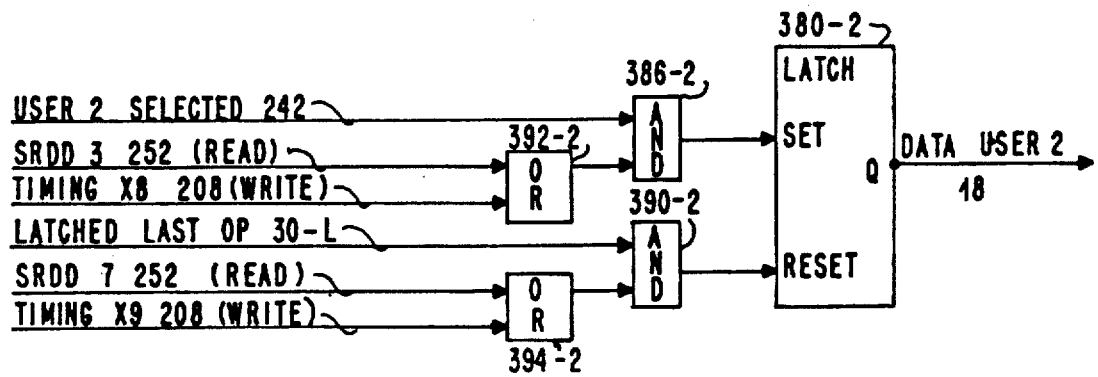
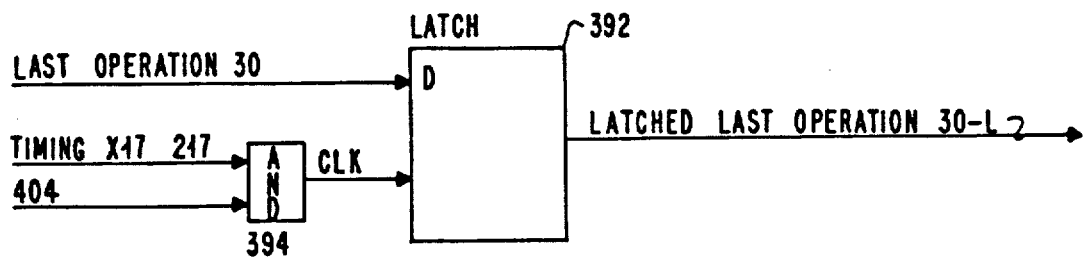
FIG. 9

ADDRESS CLOCK GENERATION 248

SRDD (SHIFT REGISTER DATA DELIVERY)
(USED FOR READ ONLY)

EFFICIENT INTERFACE FOR THE MAIN STORE OF A DATA PROCESSING SYSTEM

DESCRIPTION OF THE INVENTION

1. Field of the Invention

The present invention relates to a memory interface mechanism located between a memory and a plurality of memory user devices such as processors and/or direct memory access users.

2. Background of the Invention

Data processing systems generally comprise a memory which may be shared by a plurality of memory user devices. The memory and memory user devices are connected through a memory interface which comprises a plurality of wires and associated circuitry for controlling the memory operations. In the prior art system, the memory operations are driven by the memory user devices; this prevents the memory from being used at its fastest rate.

In addition, the conventional interfaces are not flexible; this means that modifications have to be made to the memory user devices when it is desired to change the system memory.

OBJECTS OF THE INVENTION

An object of the invention is to provide an improved, simple memory interface between a memory and at least one memory user device which is efficient in terms of memory performance.

Another object of the invention is to provide an improved memory interface which is modular so that user devices may be added in the system without redesigning the whole system.

Another object of the invention is to provide an improved memory interface which allows the refresh operations to be done without any impact on the user device operations.

Another object of the present invention is to provide an improved memory interface which presents a high level of reliability.

BRIEF SUMMARY OF INVENTION

According to the present invention, a memory interface mechanism is connected between a plurality of memory user devices and a memory controller controlling the read and write memory operations requested by the user devices. The memory interface mechanism comprises address bus (20) and data bus (22) which are shared by the user devices and used by a user device selected to perform a memory operation to send the memory address to the memory controller and receive or send the data read from or to be written into the memory. The memory interface also comprises:
- one memory request line (11,12) per user device which is activated by the user device when it requests an access to the memory for performing a memory read or write operation,
- a last operation line (30) shared by the user device which is activated by one user device when its memory transfer is completed,
- at least one address user indicator line (15,16) per user device,
- at least one data user indicator line (17,18) per user device,
- at least one address clock line (26) which is shared by the user devices, and
- at least one data clock line (28) which is shared by the user devices.

The memory interface control means (5) are located in the memory controller. These control means are responsive to the status of memory request lines to select the request of one user device, to activate firstly the address user indicator line of said selected user device, and secondly the data user indicator line of said selected user device. These activities are during time periods when the selected user device may use the address bus and data bus, respectively, and to send address and data clock timing pulse signals on the address and data clock lines to time the transfer of the address on the address bus and of the data on the data bus.

User interface control means (3-1, 3-2) are located in each user device. They activate the user request lines to control the memory transfers through the address and data bus under control of the address and data clock pulse signals.

BRIEF DESCRIPTION OF THE DRAWING

FIGS. 3A-3D when assembled as shown in FIG. 3, show a detailed implementation of the circuitry shown in FIG. 2.

FIGS. 4A-4D when assembled as shown in FIG. 4, show the block diagram of the user device circuitry at the memory controller side of the interface as needed to control the memory operations through the interface.

FIG. 9 shows a detailed implementation of data user generation circuit 246 of FIG. 4.

DETAILED DESCRIPTION OF THE INVENTION

Figure 1:
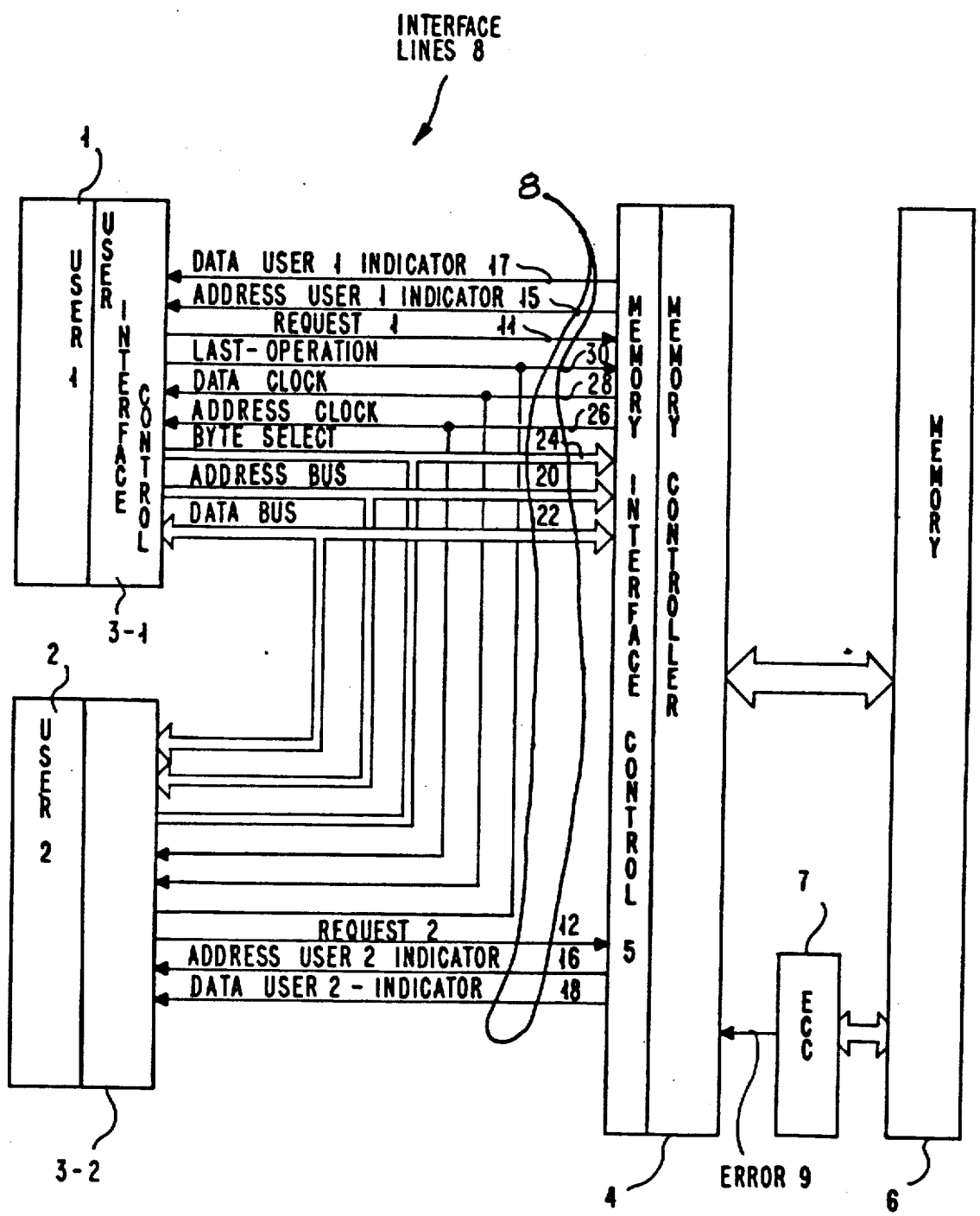
FIG. 1 shows schematically the interface wires between two memory user devices and a memory.

FIG. 1 shows the memory interface lines between memory controller 4 and first and second memory devices which will be named users 1 and 2. Only two users are shown in FIG. 1, but there may be more users.

Memory controller 4 controls the accesses to memory 6 in accordance with the control and data information on interface lines 8. It comprises conventional control means, which will not be described in detail, for accessing a memory. It also comprises a memory interface control circuit 5, which will be described in detail in reference to FIG. 4 for monitoring the interface lines according to the present invention.

Memory 6 is provided with an error correction mechanism ECC 7 which sends an error indication signal to memory controller 4 through line 9.

Interface lines 8 comprise dotted (i.e. commonly shared) lines which are common to all users and lines which are specific to each user.

The user specific lines are the request lines 11 and 12, the address user indicator lines 15 and 16 and the data user indicator lines 17 and 18.

Request 1 and request 2 lines 11 and 12 are activated by user 1 and user 2, respectively, when they request a memory read or write transfer access.

Address user indicator lines 15 and 16, connecting memory controller 4 to user 1 and user 2, respectively, are activated by memory interface control circuit 5. One of these lines is activated to inform user 1 or user 2, as the case may be, that it can use the address bus 20 and the common control lines 24, 26, and 30 of the interface.

Data user indicator lines 17 and 18, connecting memory controller 4 to user 1 and user 2, respectively, are activated by memory controller 4. One of these lines is activated to inform user 1 or user 2, as the case may be, that it can use the data bus 22 of the interface.

The dotted interface lines which are common to all users are the address bus lines 20, the data bus lines 22, the byte select lines 24, the address clock line 26, the data clock line 28 and the last operation line 30.

Address bus lines 20 are used by a user to send the memory address to the memory controller 4.

Data bus lines 22 are bidirectional lines used to carry the data to be written into or read from the memory.

In a preferred embodiment of the present invention, wherein the memory is organized in 4-byte words, byte select lines 24 comprise four lines to indicate in WRITE mode which bytes have to be updated in the addressed word in the memory. These four lines are inactive in READ mode.

Data clock line and address clock line 26 and 28 carry data and address clock signals which are used to time the operations on the address and data busses 20 and 22.

In the preferred embodiment of the present invention, there is only one request line and one address user indicator line per user and only one address clock line and one data clock line; however, there may be a plurality of such lines if needed. For example, in some cases, where the LSSD technique (Level Scan Sensitive Design) is used to design the logic circuitry, two address clock lines and two data clock lines may be needed.

The limitation on the number of users is governed by the loading on the data and address busses 20 and 22. The signals on the address and data user indicator lines tell the users to whom the address and data busses 20 and 22 are devoted at a given instant.

User interface control circuits 3-1 and 3-2 are provided at the user side of the interface to monitor the interface lines. This circuit will be described later on in reference to FIG. 3.

The users initiate memory operations by activating their request lines 11, 12. The memory controller selects one request to be serviced at a given instant and, depending upon which user is selected, activates firstly the address user indicator line 15 or 16, and secondly the data user line 17 or 18. The transfers of the addresses and data on busses 20 and 22 are performed independently and are timed by the address and data clock signals on lines 26 and 28 sent by the memory controller. The selected user controls the address and data transfer counts and ends the transfer by activating the last operation line 30. Then the user waits for the deactivation of its address and data user indicator lines 15 or 16 and 17 or 18 to present a new request, if any. As will be explained later on, the selected user performs the error detection and reporting.

The main advantage of this interface is that the users and the memory each have their own clock. They do not have to be synchronized, and can run at their own pace which allows the best performance to be obtained from each device. Data is written/read in memory at the maximum rate in page mode, i.e. it is not slowed down by having to wait for the next multiple of user cycles to end the memory operation.

Consequently, several types of memory cards and various memory configurations can be operated from the same user without any change in the user hardware and software. Any kind of memory may be used, provided the maximum speed at which the data are extracted from the memory does not overrun the user thruput.

The present interface allows the best possible usage to be made of an important feature of dynamic memories that permit fetching data faster in page mode. Whenever possible, the data are read or written in this mode of operation. Read or write operations are transparent to the user which has only to deliver the next sequential address with each address clock signal supplied by the memory controller on line 26.

The refresh operation of the memory is also transparent to the users. If a refresh operation is mandatory while a user is being served, the memory controller stops sending the clock signals on lines 26 and 28 for a while and then the memory operation resumes at completion of the refresh.

The error processing by the error correction mechanism 7 of the memory is also transparent to the users. As in the case of the refresh operation, whenever an extended correction has to be performed, the memory controller does not deliver any clock signals on lines 26 and 28 until the error is corrected; after that the operation is resumed.

Any type of memory operation may be executed and the byte select lines allow selection of any or all the bytes of a word to be updated. This can be used whenever a write operation is performed in page mode but the first and last write operation of a data burst memory transfer may be partial write operations or full write operations.

As will be apparent from the description of the interface circuitry, the user operations may be pipelined. This means that, at the boundary of two requests, the second request begins to be serviced before the data transfer with the first user is ended. This improves the overall memory thruput.

The circuits at the user side of the interface will now be described.

Figure 2:
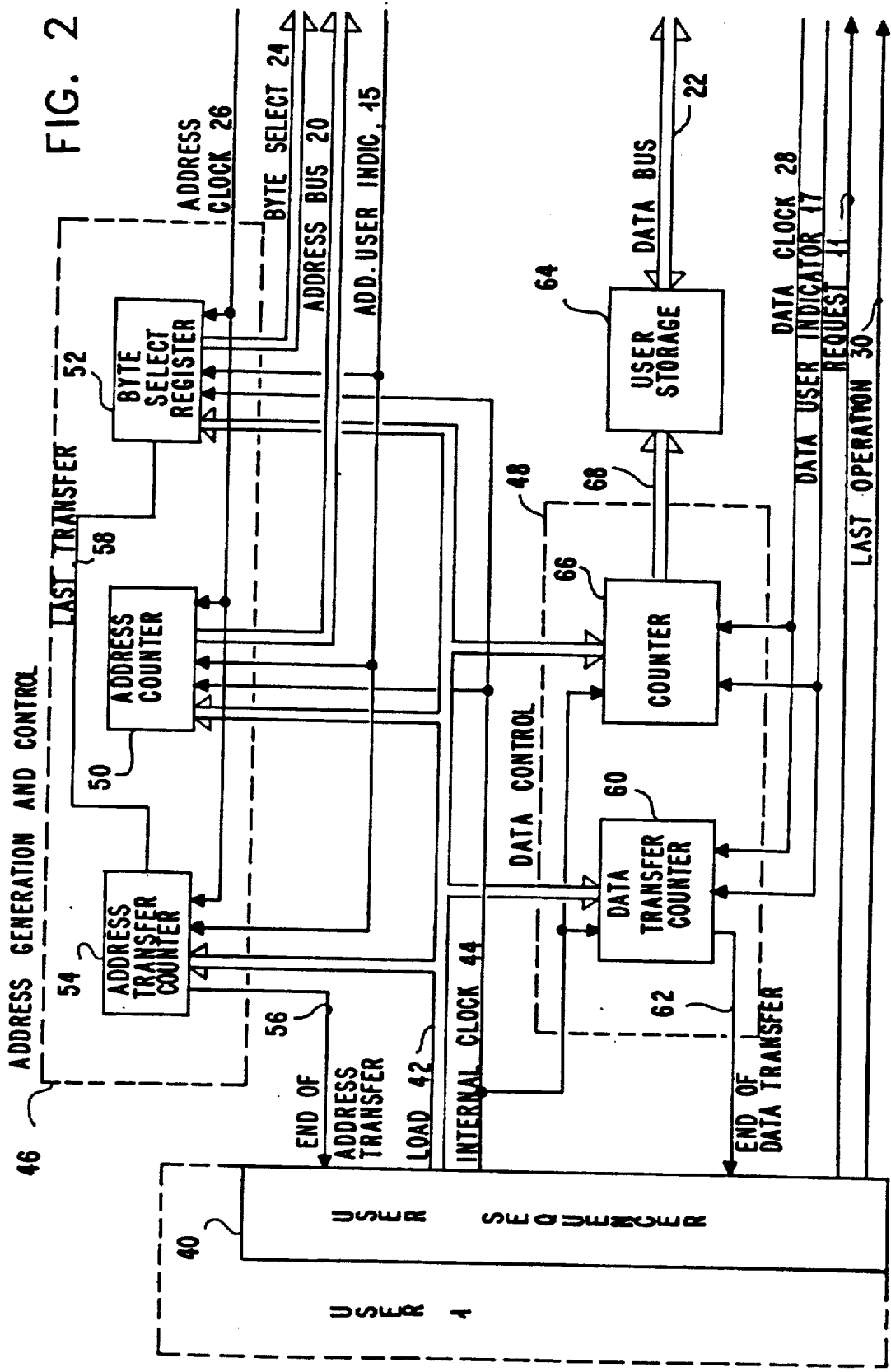
FIG. 2 shows the block diagram of the user device circuitry at the user side of the interface, needed to control the memory operations through the interface.

FIG. 2 shows the user block diagram and data flow. User sequencer circuit 40, which is assumed to be located in user device 1, activates the request line 11 when a memory access is requested by user 1. When the user request may be serviced, the memory controller activates in due time, the address user indicator line 15 and data user indicator line 17 and sends the address clock and data clock signals on lines 26 and 28.

At the start of transfer, sequencer 40 loads the transfer parameter P through bus 42, and under control of internal clock signals on line 44, load parameter P into address generation and control means 46 and into data control means 48.

Address generation and control means 46 comprises address counter 50 which is loaded at the start of transfer with the starting memory address pointing to the location where the first memory operation is to be performed. This counter is then incremented at the address clock rate and thus provides the memory address on bus 20.

Byte select register 52 provides signals on bus 24 which are all inactive in read mode. These signals are set at specific values during the first and last transfer in write mode to select the bytes which are to be updated. During the intermediate transfers of a write operation in page mode, all lines of bus 24 are active to select the four bytes of the addressed words.

Address transfer counter 54 is loaded at the start of transfer with the count of memory accesses requested by the user and its content is decremented at the address clock rate. Thus, it generates an end of address transfer signal on line 56 when its content becomes equal to 0. It generates a last transfer signal on line 58 which is provided to byte select register 52 to allow all or some lines of the byte select bus 24 to be activated during the last transfer as previously explained.

Counters 50 and 54 and register 52 in circuit 46 are responsive to the address clock signal on line 26 and to the address user indicator signal on line 15.

Data control means 48 comprises data transfer counter 60 which is loaded with the memory transfer count when a memory operation is requested by the user. Then, this count begins to be decremented at the data clock rate when the data user indicator line 17 becomes active. Counter 60 provides an end of data transfer signal on line 62.

The end of address transfer signal on line 56 and the end of data transfer signal on line 60 are provided to sequencer 40 which generates the last operation signal on line 30 therefrom.

The data to be written into the memory or the data read from the memory are stored in buffer storage 64. Counter 66, which is loaded when a memory operation is requested by the user with the first address of storage 64 of the burst to be transferred, is then decremented at the data clock rate when signal on data user indicator line 17 is active. This is done to load or to deliver successively the data corresponding to each memory address.

The output bus 68 of counter 66 provides the address of storage 64. Data bus 22 provides the data read from memory 6 to be written into storage 64 (read mode) or provides the data read from storage 64 to be written into memory 6.

FIGS. 3A to 3D describe the detailed implementations of the address generation and control circuit 46 and the data control circuit 48 together with the circuit in sequencer 40 which generates the last operation signal on line 30 (FIG. 3C) and the error check circuit (FIG. 3D) which is part of user device 1.

Figure 3B:
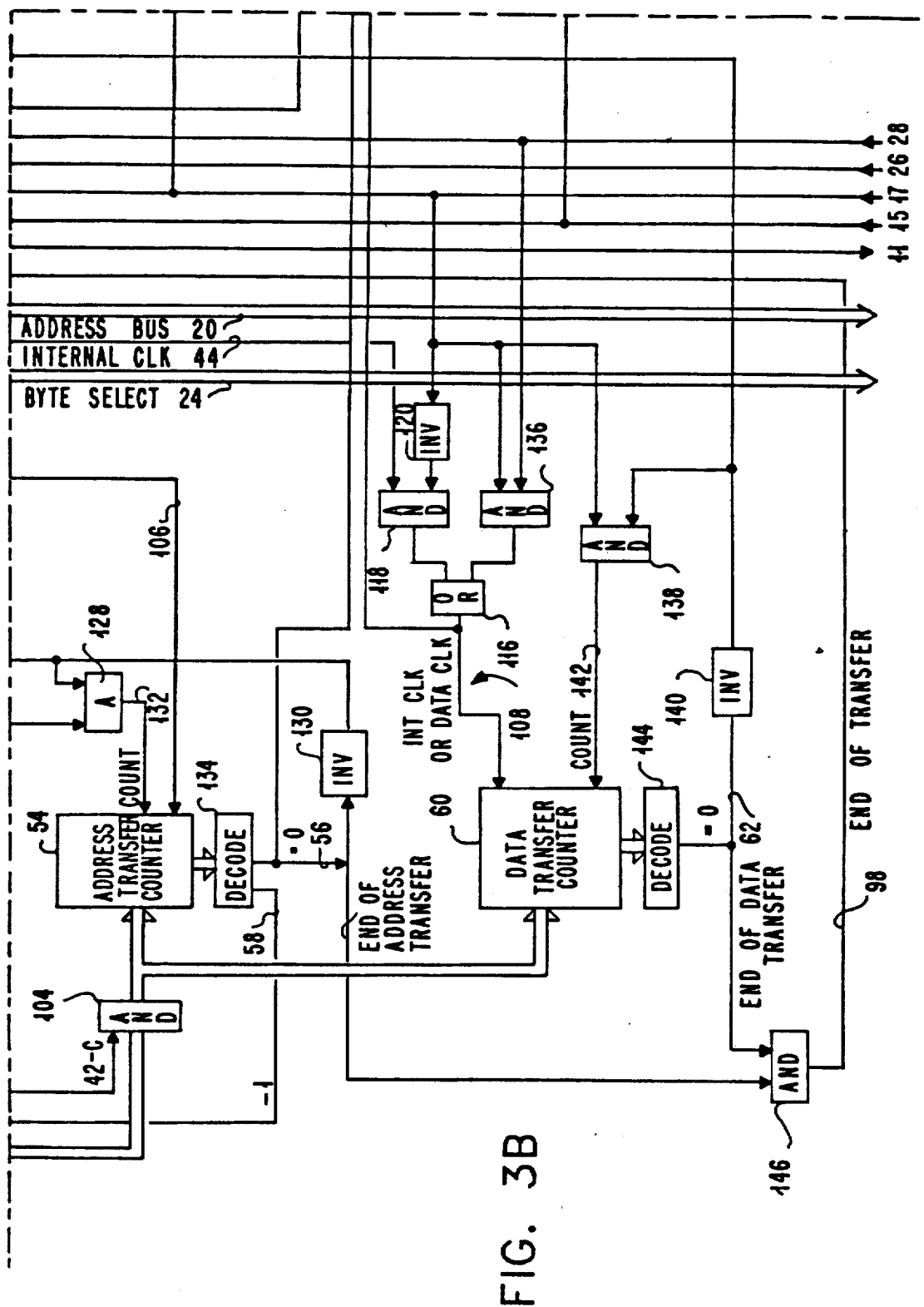
Figure 3C:
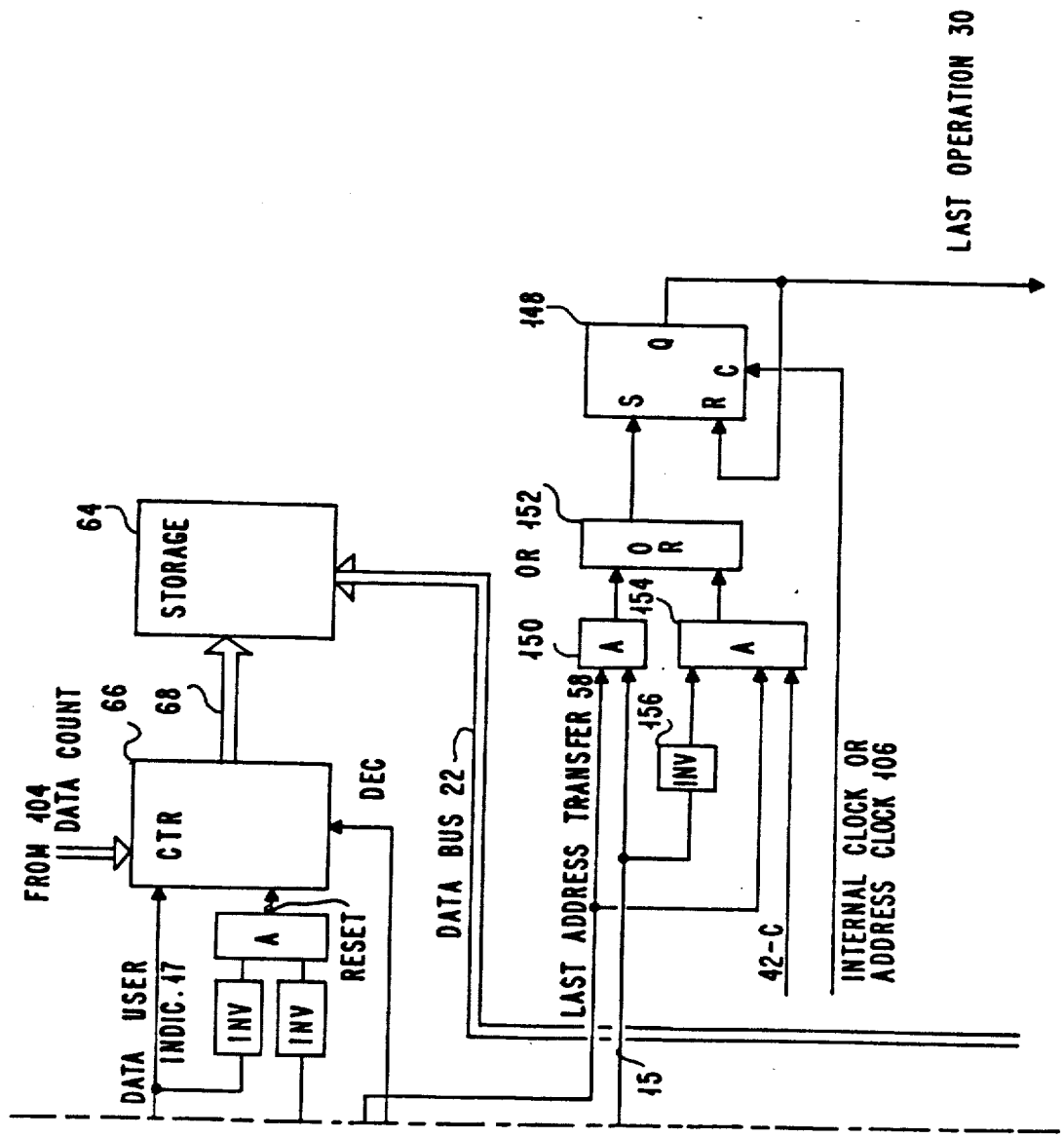

All user devices comprise circuits which are identical to those shown in FIGS. 3A to 3C.

A memory transfer (read or write) is initiated in FIG. 3A by user sequencer 40 which activates start of transfer line 80. This signal is provided to one input of AND gate 82 which is conditioned when the address user line and data user line 15 and 17 are inactive and when line 84 is active. The signals on lines 15 and 17 are provided to AND gate 82 through inverters 86 and 88. The output signal of AND gate 82 on line 90 is provided to the set input of latch 92. The Q output line of latch 92 is provided to the set input of latch 96, to the reset input of latch 92 and is the request line 11. The reset input of latch 96 is connected to end of transfer line 98. The memory sequence signal on Q-output line 100 of latch 96 is active during the memory transfer.

The complementary Q output line of latch 96 is line 84 which thus conditions AND gate 82 when the end of transfer line has been activated so that a new start of transfer request on line 80 may be serviced by activating request line 11.

Receiving the request signal on line 11, the memory controller activates firstly the address user line 15 and secondly the data user line 17 as will be described later; also the address and data clock signals are provided on lines 26 and 28.

Latches 92 and 96 are clocked by the internal clock signal on line 44. The transfer parameters are loaded into address counter 50, BS register 52, address transfer counter 54 and data transfer counter 60 from parameter bus 42-P under control of loading pulses on lines 42-A and 42-C which are provided to AND gates 102 and 104.

The address load pulse on line 42-A conditions AND gate 102 which thus provides the address parameter from bus 42-P into address counter 50 and sets the four stages of register 52 to selected values which depend upon the memory operation, as explained in reference to FIG. 2.

The count load pulse on line 42-C conditions AND gate 104 which thus provides the count parameter from bus 42-P into address transfer counter and data transfer counter 60.

During this initialization phase, the loading operation in counter 50 and 54 and in register 52 is performed under control of the internal clock signal which is gated on line 106. The loading operation of counter 60 is performed under control of the internal clock signal which is gated on line 108.

The internal clock signal on line 106 is provided by OR gate 110, AND gate 112 and inverter 114. Inverter 114 inverts the address user indicator signal from line 15 and thus provides an active signal at one input of AND gate 112 when line 15 is not activated. When conditioned, AND gate 112 provides the internal clock signal from line 44 to one input of OR gate 110.

The internal clock signal on line 108 is provided by OR gate 116, AND gate 118 and inverter 120. Inverter 120 inverts the data user indicator signal from line 17 and thus provides an active signal at one input of AND gate 118 when line 17 is not activated. When conditioned, AND gate 118 provides the internal clock signal from line 44 to one input of OR gate 116.

The content of address counter 50 is incremented at the address clock rate when the address user indicator signal on line 15 becomes active.

AND gate 122 is conditioned when memory sequence signal on line 100 and address user signal on line 15 are active. When conditioned, AND gate 122 provides the address user clock signal to an input of OR gate 110. OR gate 110 provides the address clock signal on its output line 106 which causes the content of address counter to be incremented when the signal on line 17 is active. The address counter content is provided on address bus 20 through AND gate 124 which is conditioned by the signal on line 15.

At each address clock signal gated on line 106, BS register 52 provides, on line 24, the byte select signals. The byte select signals are always at zero for a read operation. During the first transfer of a write operation, at least one signal is at one; during the intermediate transfers, they are all at one and during the last transfer at least one signal is at one. The setting of register 52 during the last transfer is performed by AND gate 126 which is conditioned by the last transfer signal on line 58 to load register 52.

One input of AND gate 128 is connected to address user indicator line 15 and another input connected to the end of transfer line 56 through inverter 130. It provides a count active signal on line 132 during the address transfer, which causes the content of counter 54 to be decremented at the address clock rate by means of the address clock signal gated on line 106. The value of the address counter 54 is decoded by decode circuit 134. When the content of counter 54 is found equal to "one", an active signal is provided on last transfer line 58; when the content of counter 54 is found equal to "zero", an active signal is provided on end of transfer line 56.

The data user clock signals from line 28 are gated on line 108 through AND gate 136 and OR gate 116. AND gate 136 is conditioned when the data user indicator signal on line 17 is activated to provide the data clock signal to one input of OR gate 116 which thus gates the data clock signal on line 108.

Inverter 140 inverts the end of transfer signal from line 62 and provides an active signal during the data transfer. This signal is provided to AND gate 138 together with the data user indicator signal from line 17. The data count signal on output line 142 of AND gate 138 causes the content of the data transfer counter to be decremented at the data clock rate.

The value of counter 60 is decoded by circuit 144 which generates an active signal on line 62 when its content is found equal to zero.

The end of data transfer signal on line 62 and the end of address transfer signal on line 56 are provided to AND gate 146 which generates the end of transfer signal on line 98.

The data count is loaded from AND gate 104 into counter 66, (FIG. 3C) the content of which is decremented at the data clock rate by means of the signal on line 108. Counter 66 provides the address to access storage 64. The data are read from or written into storage 64 by means of bus 22.

The last operation signal on line 30 is generated by latch 148 (FIG. 3C). The set input of latch 148 is connected to the output line of AND gate 150 through OR gate 152. The inputs of AND gate 150 are the address user indicator line 15 and the last transfer operation line 58. The clock input is connected to line 106.

The reset input of latch 148 is connected to the Q output line 30 of latch 148. This allows the last operation signal on line 30 to be reset with the following Address clock and thus to the last Address XFer to memory cycle. When only one word is to be transferred, the set control signal of latch 148 is provided by AND gate 154 through OR gate 152. AND gate 154 has one input connected to the address user indicator line 15 through inverter 156, a second input connected to the last address transfer line 58 and a third input connected to the parameter load line 42-C. Thus the last operation line 30 is activated by means of the internal clock before the address user indicator signal becomes active and and it is reset by the unique address clock pulse which is received from the memory controller.

The checking circuit shown in FIG. 3D generates the address or data check signal as will be explained later after the description of the operation of circuits shown in FIGS. 3A to 3C.

When the memory controller is idle, it answers the request signal on line 11 by activating the address user indicator line 15 and the data user indicator line 17 in an asynchronous mode.

Receiving the address user indicator signal, AND gate 124 presents the first address on the address bus 20 and AND gate 127 presents the first transfer byte select pattern on bus 24. Then the user enters a waiting state for the address transfer.

Receiving the data user indicator signal, the first data word is presented on the data bus 22 and the user enters a waiting state for the data transfer.

The memory controller monitors the address and data transfer by generating the two sets of clock signals on lines 26 and 28. These two sets of clock signals are asynchronous and can be overlapped as the memory controller can deliver two address clock pulses to get two successive memory addresses while it delivers only one data clock pulse and gets one data word.

At the transfer completion, obviously, the same number of address and data clock pulses should have been delivered. The user is completely transparent to this mode of operation. It increments its address counter 50 and generates the byte select pattern on bus 24 when it receives one address clock pulse. It increments its own storage address in counter 66 and delivers or receives a new data word when it receives a data clock pulse.

At each address clock and data clock pulse, it decrements its address and data transfer counters 54 and 60, respectively.

The user enters the ending phase when the last address transfer signal on line 58 becomes active. With the next address clock pulse it generates the last memory address and the last byte select pattern which, in write mode, causes 1, 2, 3 or 4 bytes to be written into the memory, as the case may be.

It also activates the last operation line 30. The memory controller sends the last address clock pulse which resets the last operation line 30.

The data transfer is monitored in the same way until the data transfer counter content is equal to zero.

When both counters 50 and 60 are equal to zero, the end of transfer line 98 becomes active which resets latch 96.

The user keeps track of its address and data user status by means of the circuit shown in FIG. 3D. It comprises latches 160 and 162, AND gates 164, 166, 168, and 170, OR gate 172 and inverters 174 and 176.

The two inputs of AND gate 164 are connected to the address user indicator line 15 and to the memory sequence line 100. The output line of AND gate 164 is connected to the set input of latch 160 which is clocked by the signal on the internal clock line 44.

The reset input of latch 160 is connected to the address user line 15 through inverter 176.

The complementary Q output of latch 160 is connected to One input of AND gate 168, the second input of which is connected to the output line of inverter 130, FIG. 3B, which is normally active during the address transfer.

The two inputs of AND gate 166 are connected to the data user indicator line 17 and to the memory sequence line 100. THE output line of AND gate 166 is connected to the set input of latch 162 which is clocked by the signal on the internal clock line 44.

The reset input of latch 162 is connected to the data user line 17 through inverter 174.

The complementary Q output of latch 162 is connected to One input of AND gate 170, the second input of which is connected to the output line of inverter 140 which is normally active during the data transfer.

The output lines of AND gates 168 and 170 are connected to the inputs of OR gate 172. Output line 180 of OR gate 172 is the address or data user check line.

The address and data user status are stored in latch 160 and 162 from the time the memory sequence line becomes active until the ends of address and data transfer are detected. If latch 160 or 162 is reset during this period, an error status is reported on line 180.

Figure 4A:
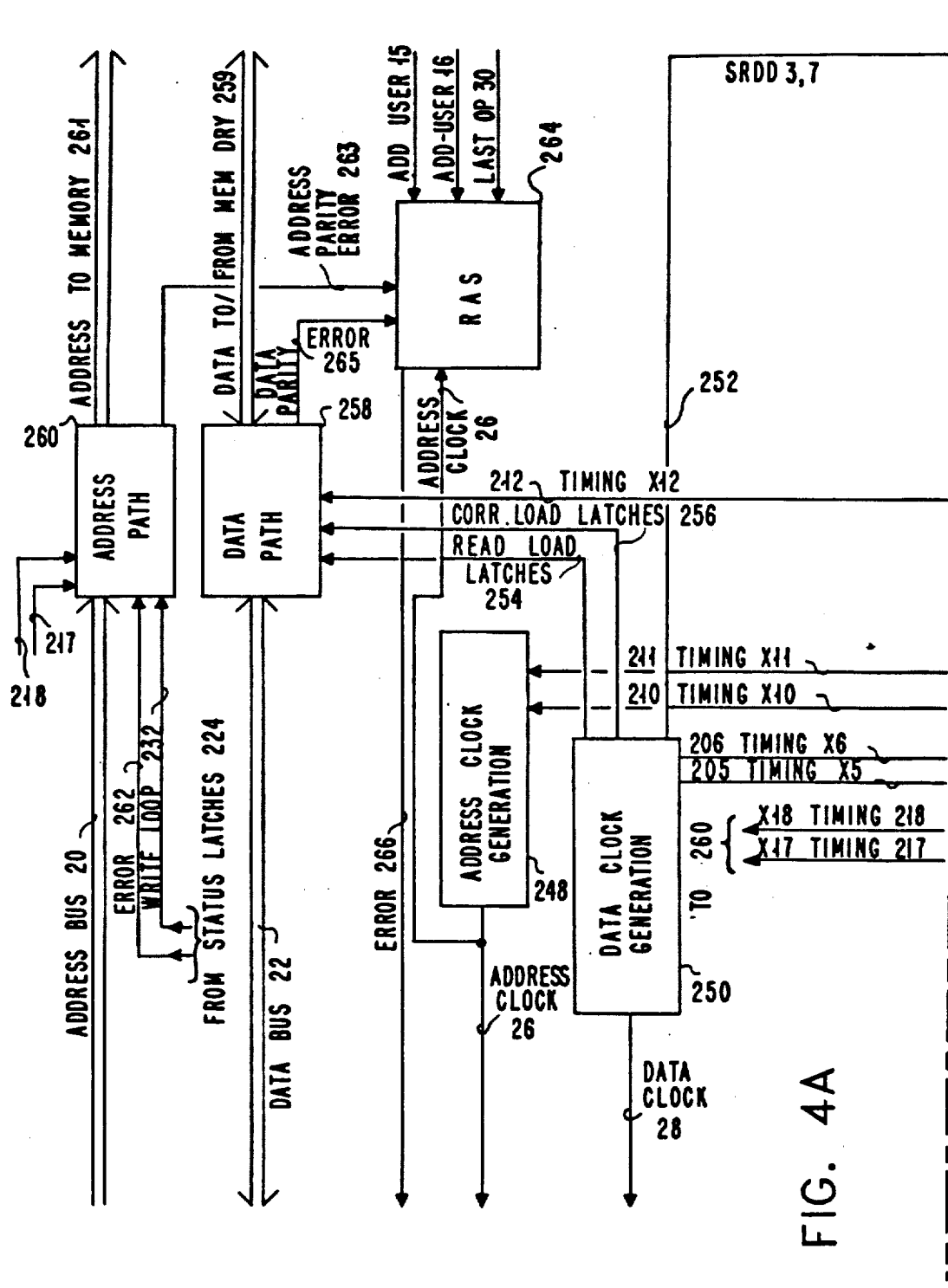

The memory interface control circuit 5 at the memory controller side will now be described in reference to FIGS. 4A and 4B.

Sequencer 200 is responsive to a request signal generated on line 222 by circuit 220 which receives and processes the signals on request 1 and request 2, lines 11 and 12 of interface 8. Sequencer 200 is responsive to signals on lines 226, 228, 230 and 232 indicative of the type of memory operation requested by the user. Signals on lines 226, 228, 230 and 232 are generated by status latches 224 which are responsive to timing signals, to the last operation line 30 and to the byte select lines 24 as will be described later on in reference to the detailed description of status latches 224. Sequencer 200 generates timing signals on lines 201 to 218 and timing signals on memory timing bus 216. Memory timing signals are used by the memory controller to control the memory operations and will not be detailed any further.

Timing line signal X1 is used to reset "Request 1 Latched" or "Request 2 Latched" depending on the selected user. Request 1 and 2 lines 11 and 12 are provided to circuit 220 which generates request 1 latches and request 2 latched signals on output lines 234 and 236. The timing signal X1, provided to AND gates 308 and 310 which are conditioned by the address user 1 and address user 2 signals on lines 15 and 16, is used to reset latches 300 and 302 depending upon which user is selected.

The request latches signals are provided to server counter 238 which is responsive to timing signal X4 on line 204 to generate the user 1 selected signal on line 240 or the user 2 selected signal on line 242. Only one of these lines is active at a time, and it is assumed that the user 1 selected line 240 is activated when request lines are not activated.

Thus, address user generation circuit 244 which is responsive to the timing signals X2, X3 on lines 202 and 203 and to the signal on user 2 selected line 242, generates the address user 1 indicator signal on line 15 and the address user 2 indicator signal on line 16.

The data generation circuit 246, which is responsive to the last operation signal on line 30, to the user 1 and user 2 selected signals on lines 240 and 242 and to the timing signals X8, X9 on lines 208 and 209, generates the data user 1 indicator signal on line 17 and the data user 2 indicator signal on line 18. The address clock generation circuit 248 provides the address clock signal on line 26 in response to timing signals X10 and X11 on lines 210 and 211.

The data clock generation circuit 250 is responsive to the timing signals X5 and X6 on lines 205 and 206 to generate the data clock signal on line 28. It also provides delayed timing signals on line 252 which are provided to data user generation circuit 246. This is because the data user indicator signals are generated at different times depending upon whether a read or write operation is performed as will be described later on in reference to the detailed description of circuit 246.

The data clock generation circuit 250 also provides control signals on lines 254 and 256 which are provided to the data path circuit 258.

The address path circuit 260 provides the address from bus 20 to the memory controller. As will be described later on in connection with the detailed description of circuit 260, circuit 260 comprises a current address register and a back up address register. Circuit 260 is responsive to an error signal generated on line 262 by the status latches and to write loop signal on line 232 to provide to the memory controller either the address contained in the current register or the address contained in the back up register.

The address path circuit 260 provides the address to memory 6 through bus 261. The data path circuit 258 provides or receives the data to/from the memory through bus 259.

The address path circuit 260 and data path circuit 258 generated address and data parity error signals on lines 263 and 265.

The error control circuit RAS 264 is responsive to the error signals on lines 263, 265, to the address clock signal on line 26, to the address user 1 and 2 indicator signals on lines 15 and 16 and to the last operation signal on line 30 to generate an error signal on line 266.

Figure 5:
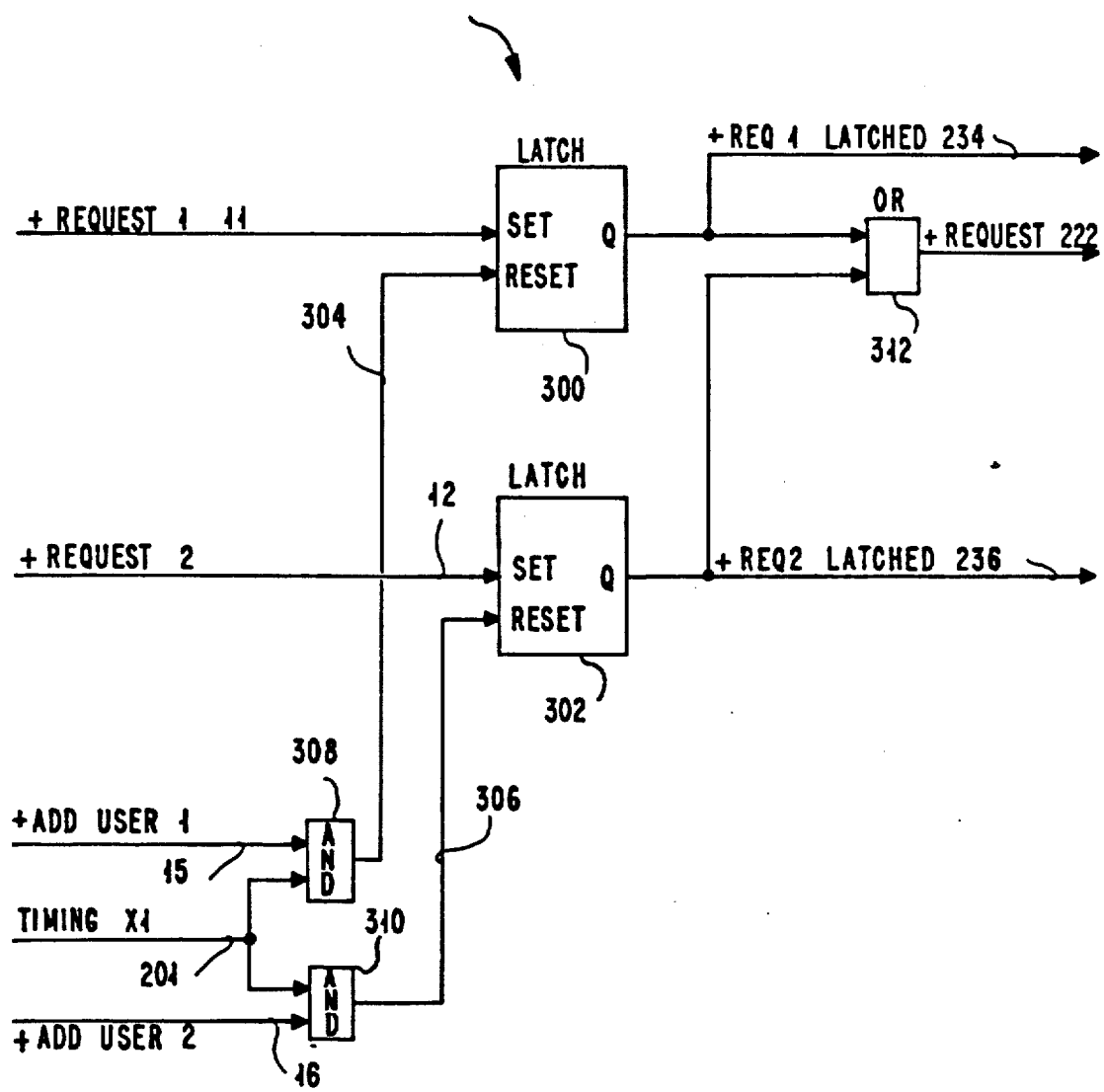
FIG. 5 shows a detailed implementation of processing and request circuit 220 of FIG. 4.

Processing and reset of request circuit 220 is shown in FIG. 5. It comprises two latches 300 and 302. The set inputs of these latches are connected to lines 11 and 12, respectively. The reset inputs of these latches are connected to the output lines 304 and 306 of AND gates 308 and 310, respectively.

The input lines of AND gates 308 are the address user line 15 and the timing line 201. The input lines of AND gates 310 are the address user line 16 and the timing line 201. Thus, once one of the address user lines 15 or 16 becomes active, the corresponding latch 300 or 302 is reset at time X1. The latch may then be set when the request line 11 or 12 is activated. The Q-output line 234 or 236 provides the request 1 or request 2 latches signal.

OR gate 312 has two input lines connected to the Q-output lines of latches 300 and 302 to provide the request signal on line 222 to sequencer 200.

Figure 6:
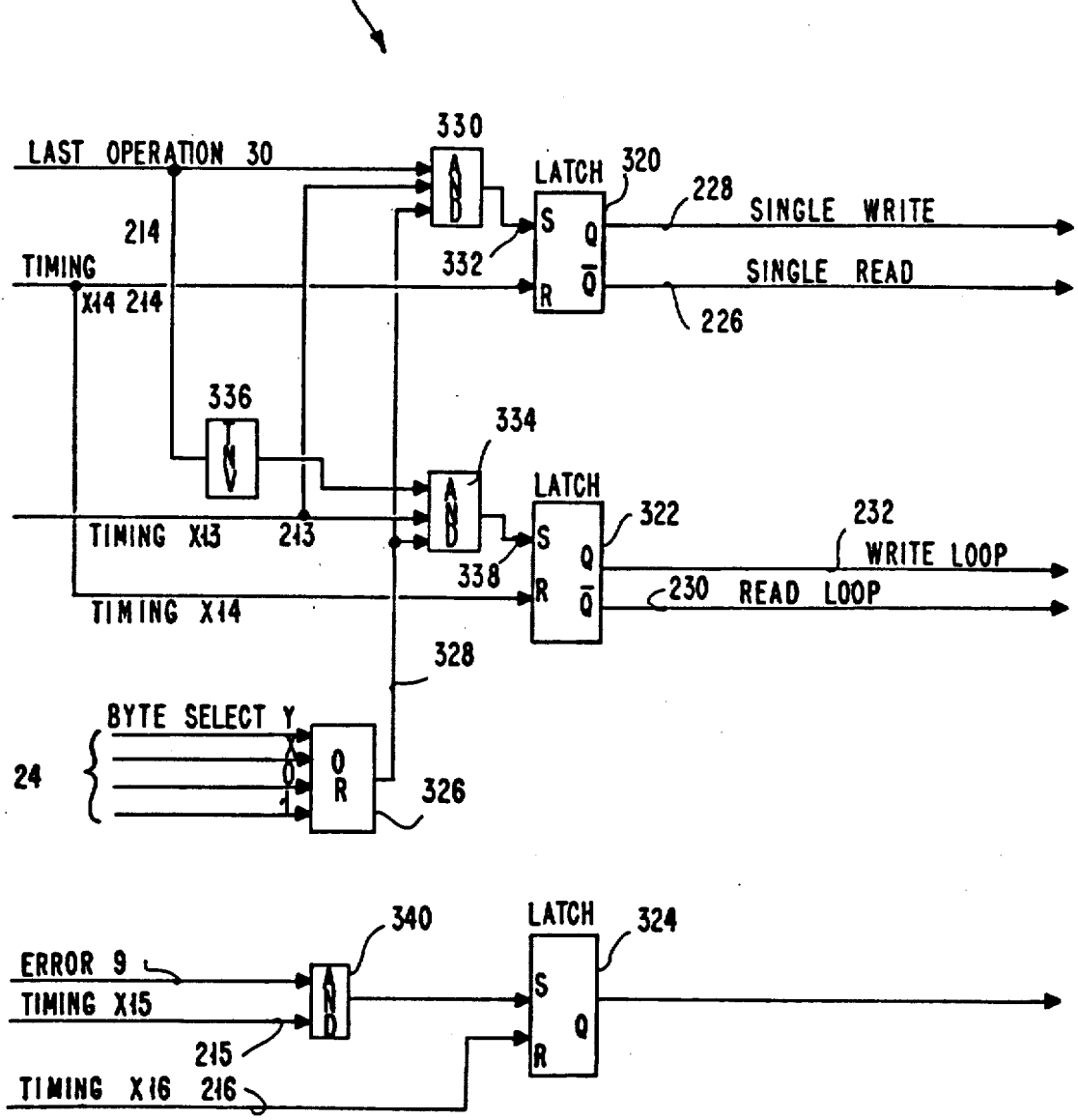
FIG. 6 shows a detailed implementation of status latches 224 of FIG. 4.

The status latch circuit 224 is shown in FIG. 6. It comprises three latches 320, 322 and 324. The configuration of bits on the byte select lines of bus 24 is provided to OR gate 326 which thus provides an up level signal on its output line 328 when at least one bit is an up level (write mode) and a down level signal when the bits are at a down level (read mode).

The thre input lines of AND gate 330 are the last operation line 30, the output line 328 or OR gate 326, and the timing line 213. The output line 332 of AND gate 330 is provided to the set input of latch 320. The reset input of latch 320 is connected to the timing line 214.

Thus, if at time X13 latch 320 is set, its Q-output signal on line 228 is active to indicate a single write operation. Otherwise its complementary Q-output line 226 is active to indicate a single read operation.

The three input lines of AND gate 334 are the output line of inverter 336, which inverts the signal on last operation line 30, the line 213 and output line 328 of OR gate 326. The output line 338 of AND gate 334 is provided to the set input of latch 322. The reset input of latch 322 is connecting to timing line 214.

Thus, if at time X14 latch 322 is set, its Q-output signal on line 232 is active to indicate a write loop operation until the last operation signal becomes active. Otherwise, its complementary Q-output line 230 is active to indicate a read loop operation signal until the last operation signal becomes active.

The error signal on line 262 is provided by latch 324 and AND gate 340. AND gate 340 has two input lines; the first line is connected to error line 9 (see FIG. 1) and the second line is connected to the X15 timing line 215. It provides an active signal which sets latch 324. The error signal on line 262 is generated on the Q-output line of latch 324. Latch 324 is reset by the X16 timing signal on line 216.

Figure 7:
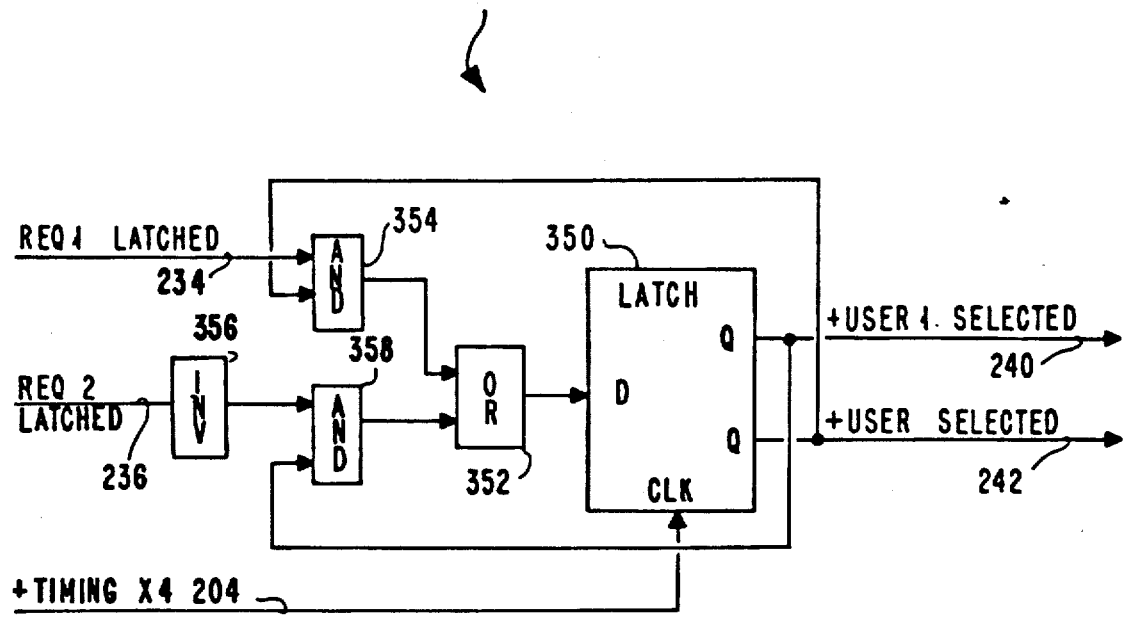
FIG. 7 shows a detailed implementation of server counter 238 of FIG. 4.

The server counter is shown in FIG. 7. It comprises a D-latch 350, the data input of which is connected to the output line of OR gate 352 and the clock input of which is connected to timing line 204. The Q and complementary Q output lines of latch 350 are the user 1 selected line 240 and the user 2 selected line 242.

The server counter is responsive to the REQ1 latched input line 234 and the REQ2 latched input line 236 to activate lines 240 and 242 according to the following truth table:

```
      Q+         REQ1, REQ2

0 0   0 1   1 1   1 0
                 -------------------------
             0 ! 0   ! 0   ! 1   ! 1 !
      Q        -------------------------
             1 ! 1   ! 0   ! 0   ! 1 !
                 -------------------------
``` which may be written: $Q+ = \bar{Q}.REQ1 + Q.\overline{REQ2}$ where Q+ is the state of the Q-output at any time as a function of the previous Q state.

To perform this logic function, the REQ1 latched line 234 is provided together with the user 2 selected line 242 to the inputs of AND gate 354.

The REQ2 latched line 236 is inverted through inverter 356 and the output line of inverter 356, together with the user 1 selected line 240, are provided to the inputs of AND gate 358.

The output lines of AND gates 354 and 358 are provided to the inputs of OR gate 352.

Figure 8:
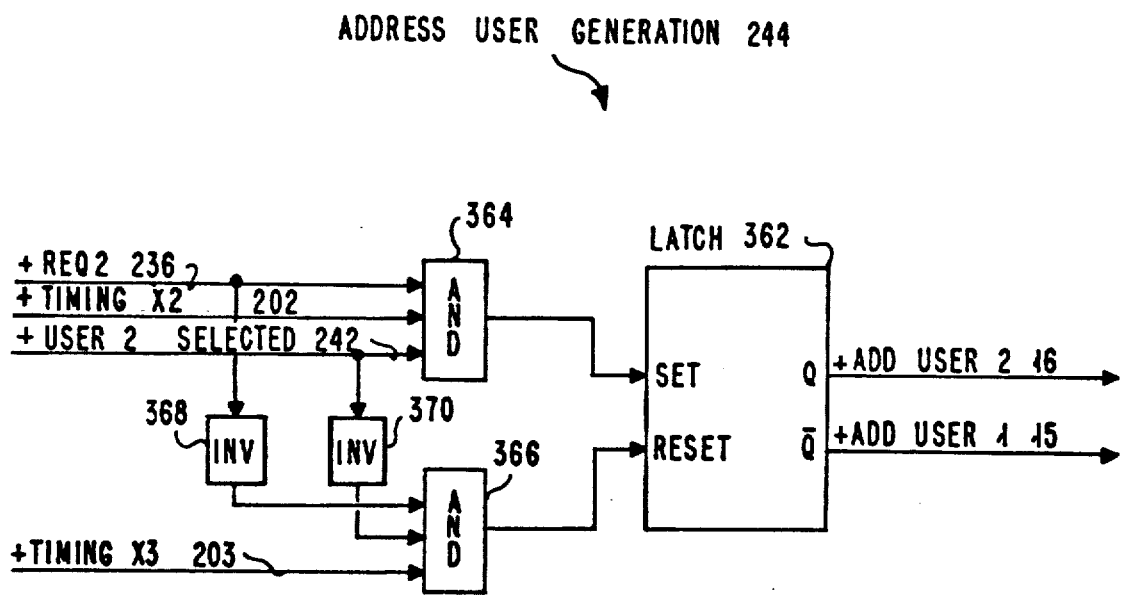
FIG. 8 shows a detailed implementation of address user generation circuit 244 of FIG. 4.

FIG. 8 shows the address user generation circuit 244. It comprises set/reset latch 362, the Q-output of which provides the address user 2 signal on line 16. The complementary Q output line provides the address user 1 signal on line 15.

The set input of latch 362 is connected to the output line of AND gate 364 and the reset input is connected to the output line of AND gate 366.

AND gate 364 provides an active signal which sets latch 362 when the REQ2 latched line 236 and the user 2 selected line 242 are at an UP level at time X2.

The REQ2 latched line 236 is provided to inverter 368 and the user 2 selected line is provided to inverter 370. The output lines of inverters 368 and 370 and line 203 are provided to the inputs of AND gate 366 which provides and active signal to reset latch 362 at time X3. At time X3 there is no active REQ2 latched signal and no active user 2 selected signal.

FIG. 9 shows the data user generation circuit 246. Data user 1 and data user 2 signals are generated on Q-output lines 17 and 18 of latches 380-1 and 380-2 respectively.

The set input of latch 380-1 is connected to the output line 384-1 of AND gate 386-1 and the reset input is connected to output line 388-1 of AND gate 390-1.

The first input of AND gate 386-1 is connected to line 240 so that AND gate 386-1 is conditioned when the user 1 selected line 240 is active.

The second input of AND gate 386-1 is connected to the output line of OR gate 392-1, the inputs of which are connected to line 252-3 (see FIG. 11) and to line 208 so as to control the set times of latch 380-1 which are different in read mode and in write mode, as indicated in FIG. 9. This is because the read data should be checked before being delivered to the user and it takes time to read a memory. However, to the contrary, the data is present at the beginning of the write operation.

The first input of AND gate 390-1 is connected to the last operation line 30-L so that AND gate 390-1 is conditioned when this line is activated.

The second input of AND gate 391-1 is connected to the output line of OR gate 394-1, the inputs of which are connected to line 252-7 (see FIG. 11) and to line 208 so as to control the reset times of latch 380-1 which are different in read and write mode.

The latched last operation signal on line 30-L is provided by D-Latch 392. The D-input of latch 392 is connected to the last operation signal line 30. The clock input of latch 392 is connected to the input of AND gate 394, the inputs of which are the X17 timing line 217 and the line 404 which is one of the output line of a tree running clock 402 as shown if FIG. 10.

The set and reset circuits for latch 380-2 are identical to the set and reset circuits of latch 380-1. The same reference numbers, with a suffix 1 or 2, are used to designate the components of these circuits.

Latch 380-2 is set when the user 2 selected line 242 is active so that the first input of latch 380-2 is connected to line 242.

Figure 10:
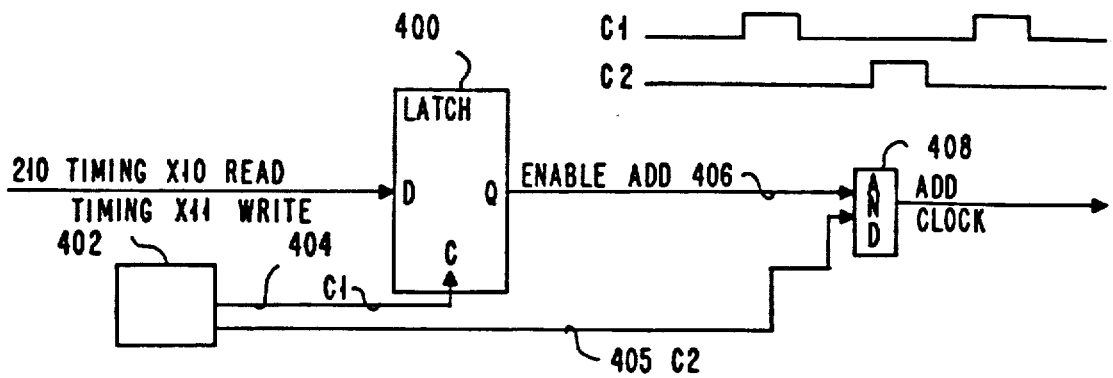
FIG. 10 shows a detailed implementation of address clock generation circuit 248 of FIG. 4.

FIG. 10 shows the address clock generation circuit 248. It comprises latch 400, the data input of which is connected to line 210 and the clock input to which is connected to free running clock circuit 402. Clock 402 provides a C1-clock pulse stream on line 404 and a C2-clock pulse stream on line 405. The C1 and C2 clock pulse streams are non-overlapped clocked signals having equal frequency as shown in FIG. 10.

Thus, latch 400 provides an enable address clock signal on line 406 which is provided to one input of AND gate 408, the second input of which is C2 signal from line 405. Thus, AND gate 408 provides the address clock signal on its output line 26.

Figure 11:
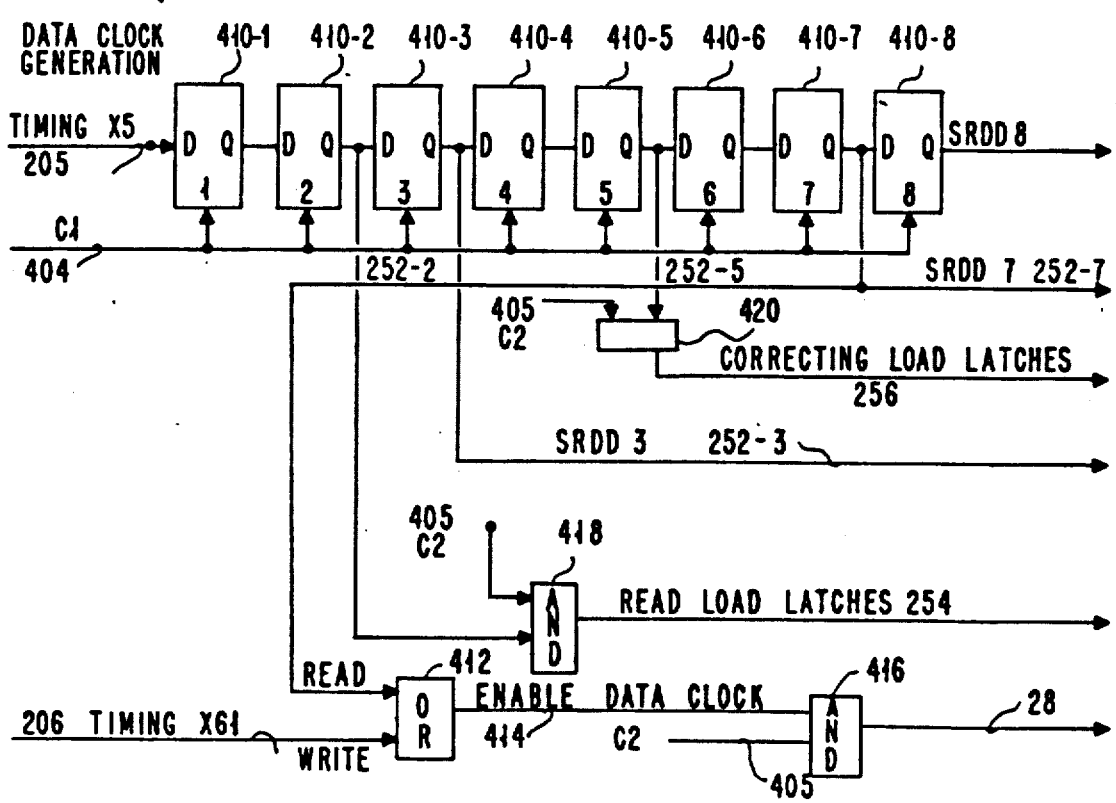
FIG. 11 shows a detailed implementation of data clock generation circuit 250 of FIG. 4.

FIG. 11 shows the data clock generation circuit 250. It comprises a shift register made of eight latches 410-1 through 410-8. The X5 timing line 205 is connected to the input of the first latch 410-1. Thus, delayed signals are provided on lines 252-2, 252-3, 252-5 and 252-7 taken at the outputs of latches 410-2, 410-3, 410-5 and 410-7, respectively. The clock inputs of latches 410-1 to 410-8 are connected to line 404.

The X6 timing line 206 and the SRDD 7 line 252-7 are connected to the inputs of OR gate 412 which provides an enable data clock signal on its output line 414 at times X6 for a write operation or at times SRDD-7 for a read operation.

The enable data clock signal on line 414 conditions AND gate 416 which gates the C2 clock signal as the data clock signal on its output line 28. The signal at the output of latch 410-2 conditions AND gate 418 which thus gates the C2- clock pulse stream on read load latch line 254 which is provide to the data path circuit 258.

The signal at the output of latch 410-5 conditions AND gate 420 which gates the C2-clock pulse stream on correcting load latch line 256 which is provided to data path circuit 258.

Figure 12:
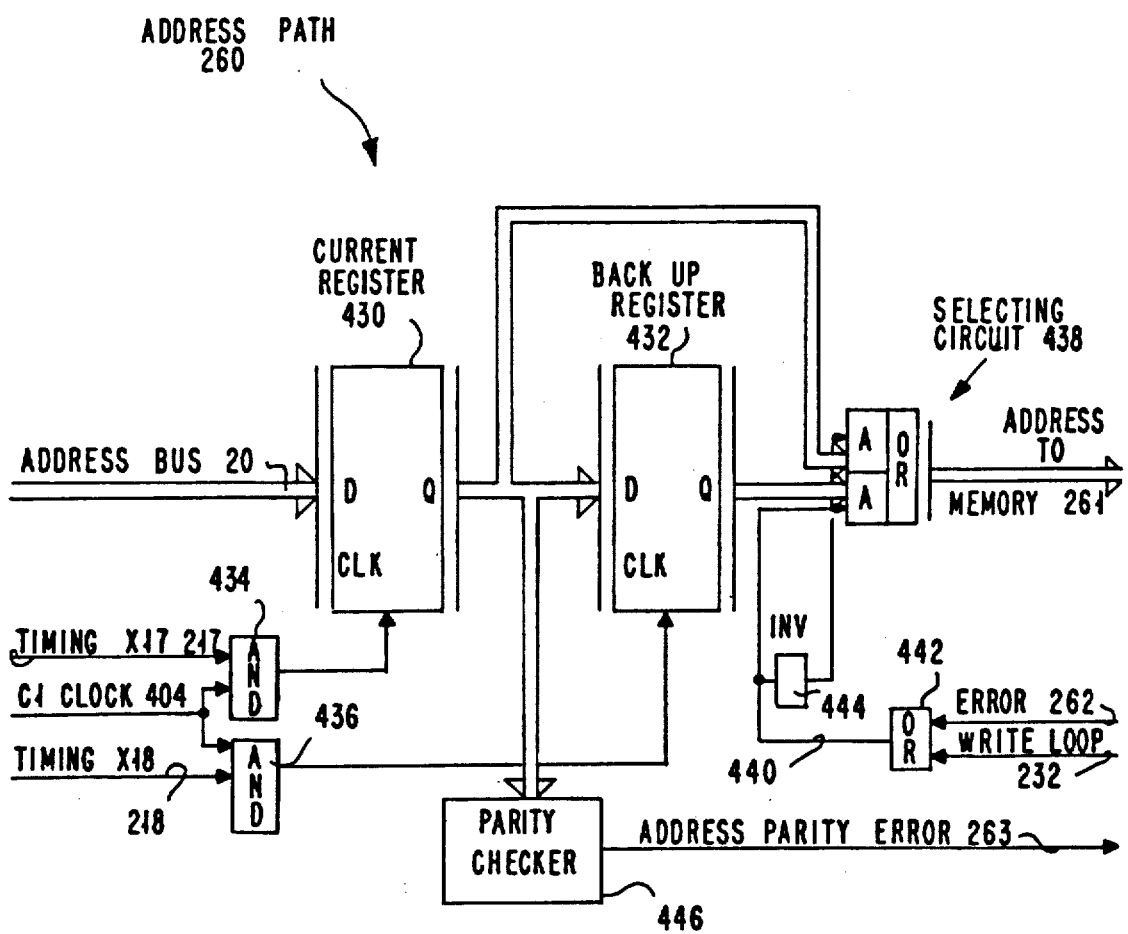
FIG. 12 shows a detailed implementation of address path circuit 260 of FIG. 4.

FIG. 12 shows the address path circuit 260. It comprises the current register 430 made of D-Latches, only one latch of which is shown in the figure, but there are as many latches as there in lines in address bus 20. The D-input of each latch is connected to a line of the address bus. Back up register 432 is made of as many D-latches as register 430. The D-input of each D-latch of register 432 is connected to the Q-output of a D-latch of register 430 as schematically shown in FIG. 12. AND gate 434 is conditioned at time X17 to gate the C1-clock signal from line 404 to the clock inputs of the latches comprising register 430.

AND gate 436 is conditioned at time X18 to gate the C1-clock signal from line 404 to the clock inputs of the latches comprising register 432.

The selecting circuit made of AND and OR gates provides either the content of current register 430 or the content of back up register 432 onto address to memory bus 261, under the control of the signal on the output line 440 of OR gate 442.

The input lines of OR gate 442 are the error line 262 and the write loop line 232. When one of these lines is active, the back up register content is gated on the address to memory bus 261; when they are inactive, the content of the current register 430 is provided onto the address to memory bus 261. To do this, the output signal from OR gate 442 is inverted in inverter 444, the output signal of which activates the selecting circuit accordingly.

Thus, when an error is detected, the memory operation may be resumed on the previous address.

The parity checker circuit 446 checks the parity of the address contained in current register 430 and generates the address parity error on line 263.

Figure 13:
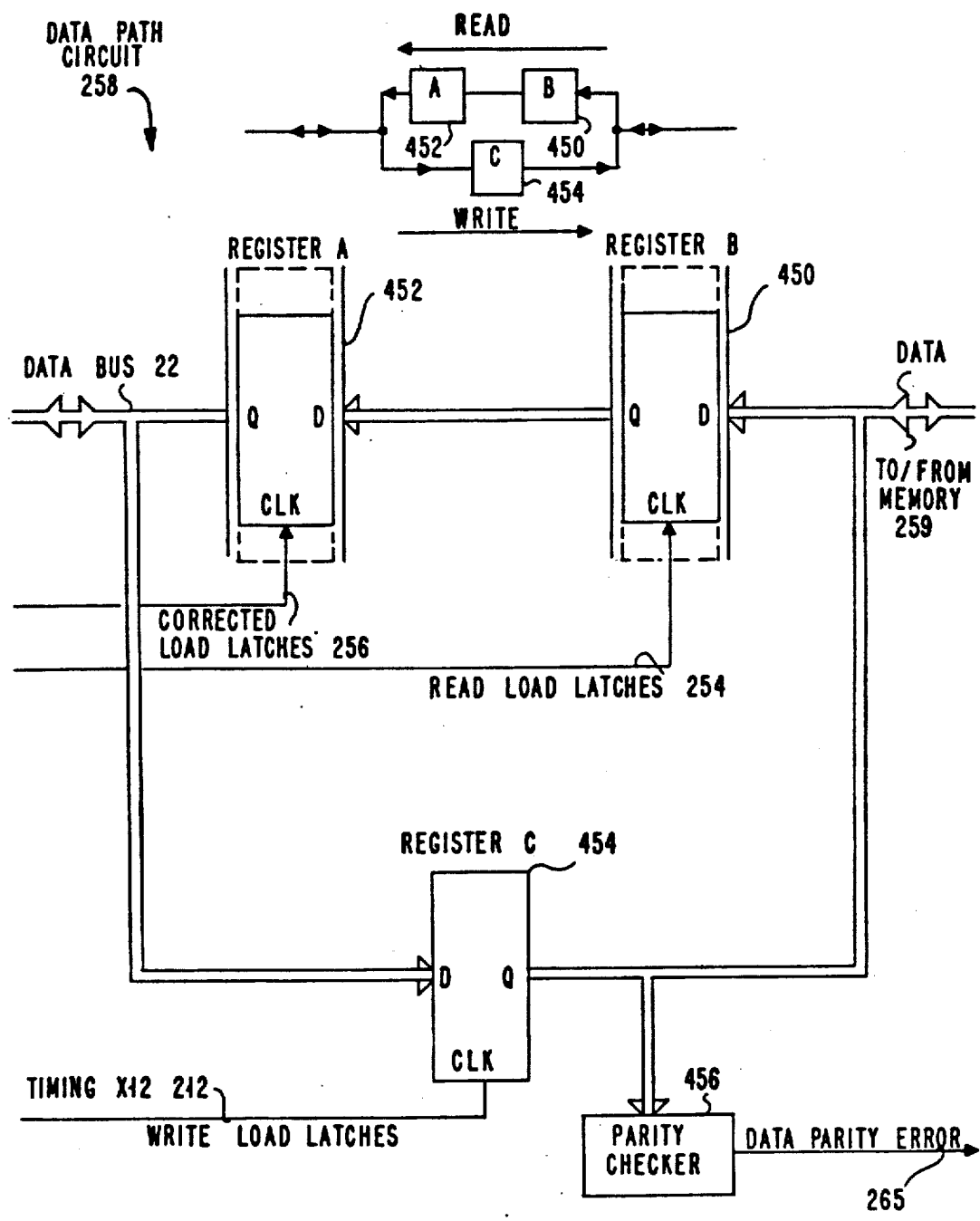
FIG. 13 shows a detailed implementation of data path circuit 258 of FIG. 4.

The data path circuit 258 is shown in FIG. 13. There are two different paths depending upon which memory operation is performed.

The read and write paths are schematically shown. The read path comprises two registers 450 and 452 comprising as many D-latches as there are lines in memory bus 22. The data read from memory 6 is provided to the D-inputs of the D-latches of register 450 and is located into this register under control of clock pulses from line 254. Then the data is transferred to the D-inputs of the latches of register 452 and is loaded into the register under control of clock pulses from line 256.

This allows the correction to the data to be performed before it is loaded onto register 452 and provided onto bus 22. The data to be written into the memory is loaded from bus 22 into register 454 which comprises as many D-latches as they are lines in bus 22. The bus lines are connected to the D-inputs of the latches, the clock inputs of which are connected to the timing X12 line 212.

The Q-output lines of the latches comprising register 454 are connected to the data to memory bus 259.

The parity checker 456 connected to bus 259 generates the data parity error signal on line 265.

Figure 14:
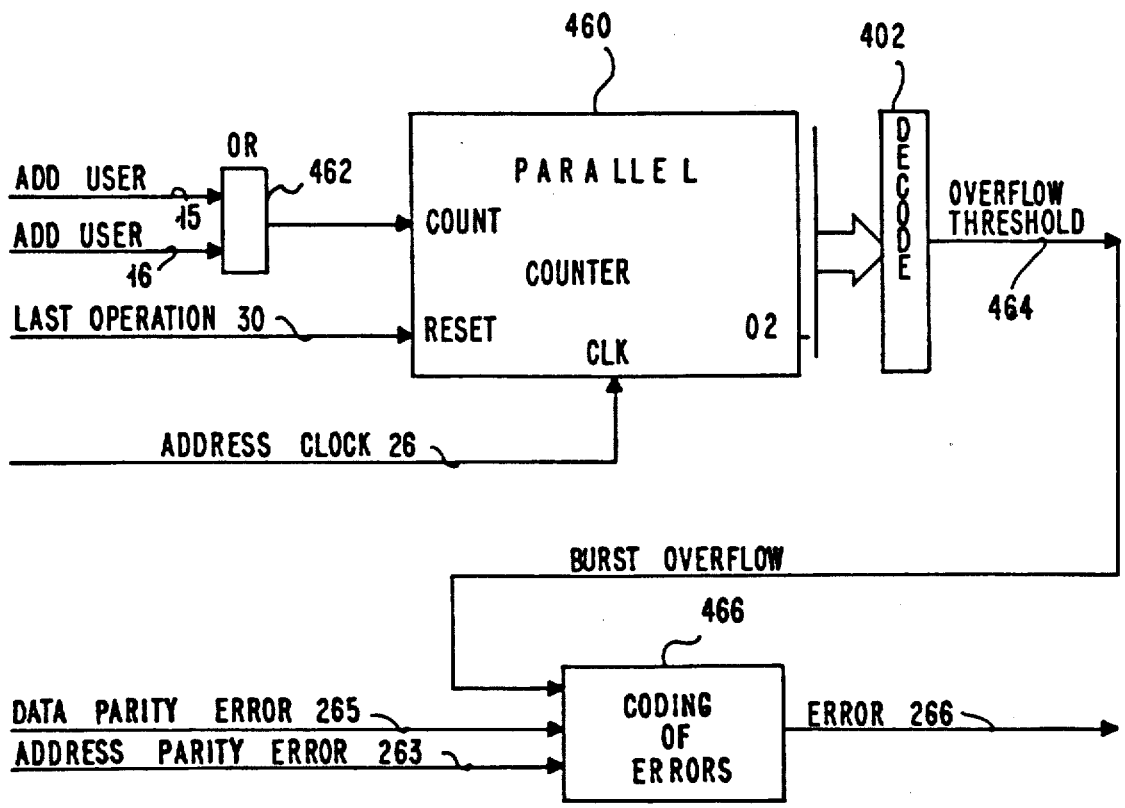
FIG. 14 shows a detailed implementation of RAS circuit 264 of FIG. 4.
Figure 15:
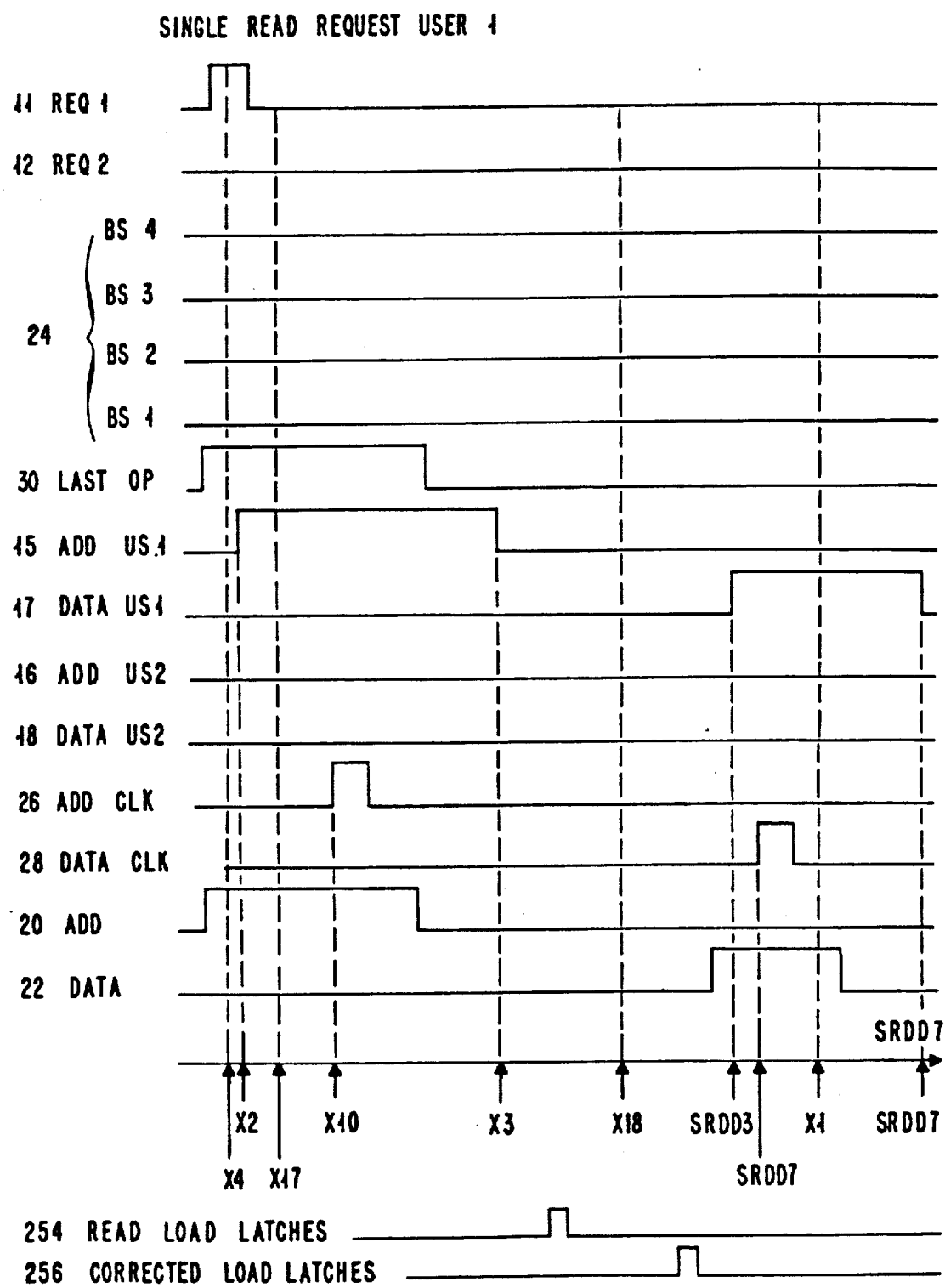
FIG. 15 is the timing diagram of a single read operation.
Figure 16:
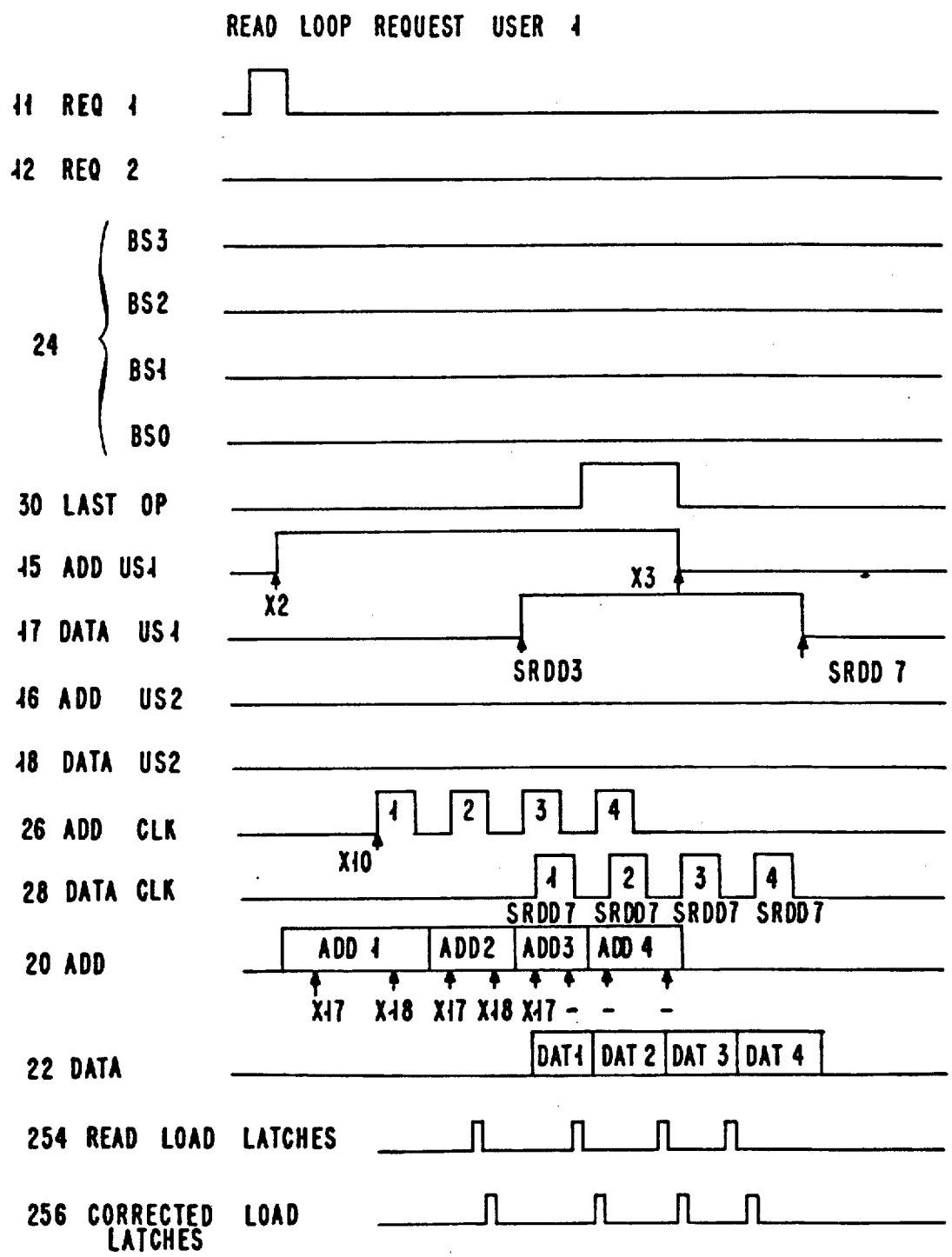
FIG. 16 is the timing diagram of a read loop operation.
Figure 17:
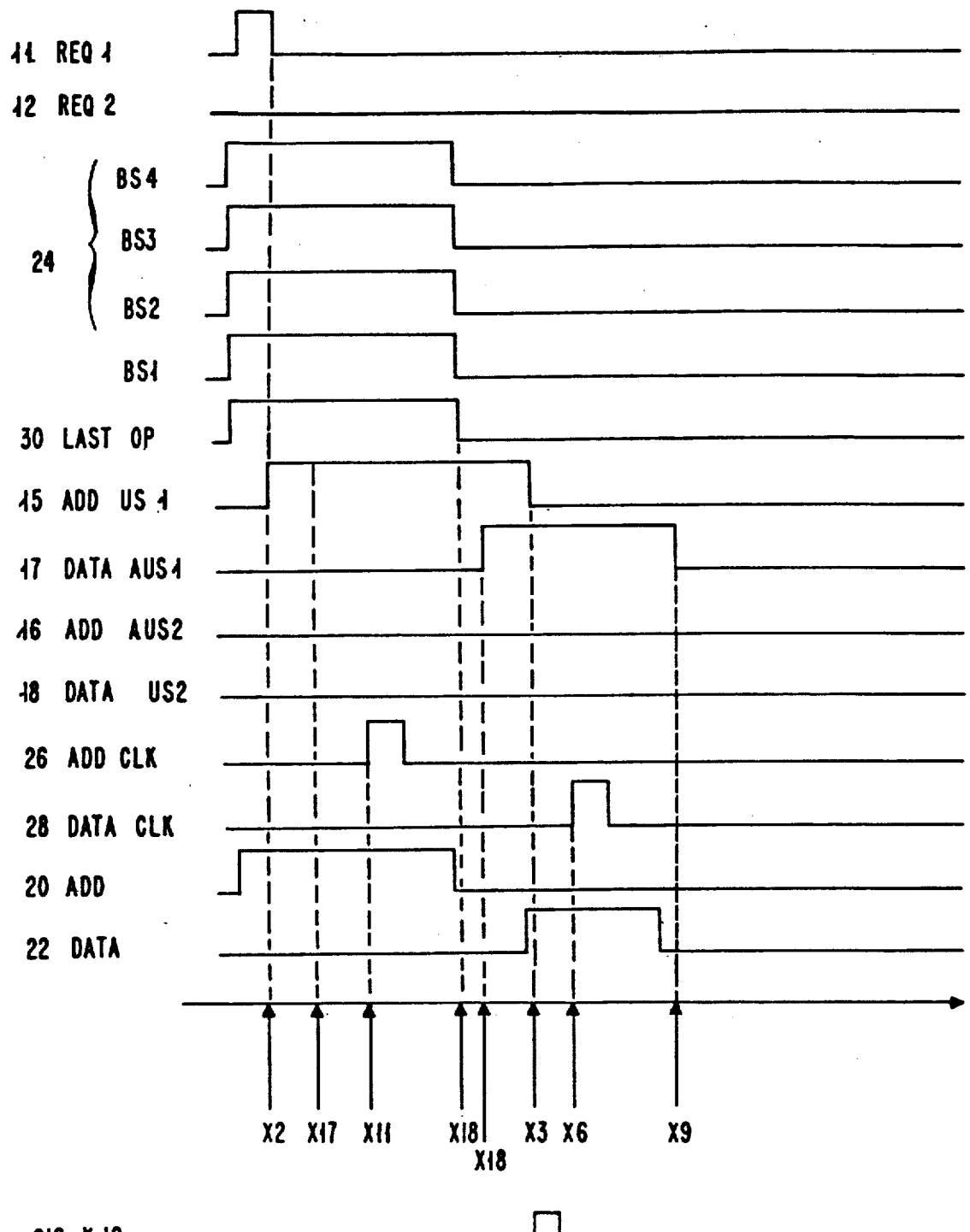
FIG. 17 is the timing diagram of a single write operation.
Figure 18:
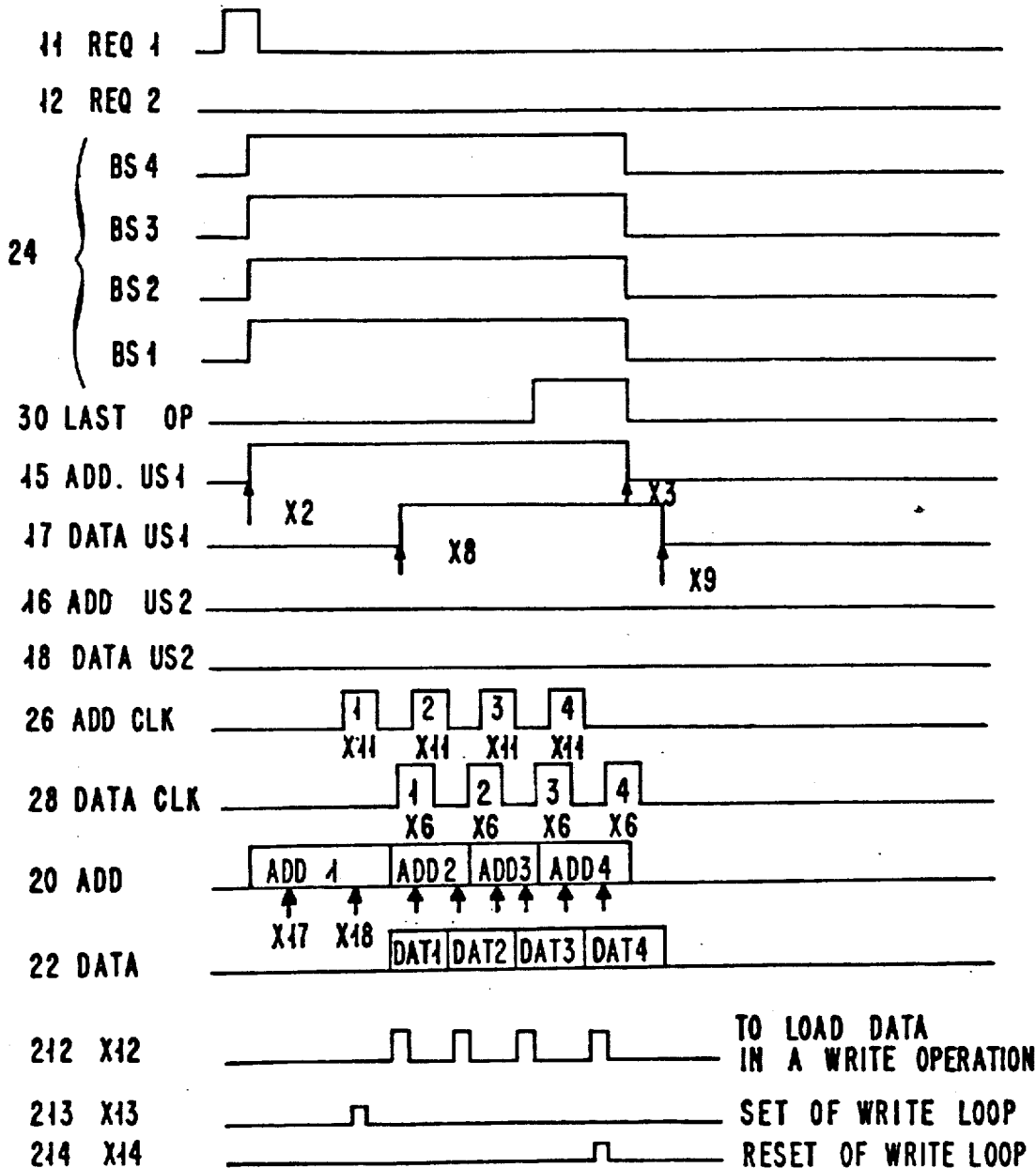
FIG. 18 is the timing diagram of a write loop operation.

The RAS circuit 264 is shown in FIG. 14. It comprises a parallel counter 460 which counts the address clock signals from line 26 when address user 1 or address user 2 signals are active. Lines 15 and 16 are connected to the inputs of OR gate 462, the output line of which is connected to the count input of counter 460. The reset input of counter 460 is connected to last operation line 30.

The counter 460 content is decoded through decode circuit 402, which provides an active signal on its output line when counter 460 reaches a count value equal to a threshold which is fixed according to the specific application of the present invention.

This signal indicates an overflow error and is provided to the error coding circuit 466 together with data parity error from line 265 and the address parity error from line 263.

Circuit 466 provides the error signal on line 266.

The timing diagrams of the four memory operations, namely single read, read loop, single write and write loop operations are shown in FIGS. 15 to 18.

We claim:

1. A memory interface mechanism connected between a plurality of memory user devices and a memory controller controlling the read and write memory operations requested by the user devices, comprising address bus (20) and data bus (22) which are shared by the user devices and used by a user device selected to perform a memory operation to send the memory address to the memory controller and receive or send the data read from or to be written into the memory, characterized in that it comprises:

one memory request line (11, 12) per user device which is activated by the user device when it requests an access to the memory for performing a memory read or write transfer, a last operation line (30) which is shared by the user devices and which is activated by the selected user device during the last memory access of its memory operation, at least one address user indicator line (15, 16) per user device which is activated to permit the user device to use the address bus, at least one data user indicator line (17, 18) per user device, which is activated to permit the user device to use the data bus, at least one address clock line (26) which is shared by the user devices, at least one data clock line (28) which is shared by the user devices, memory interface control means (5) located in the memory controller which are responsive to the active status of memory request lines and of the last operation line to determine the user device whose request may be serviced and select said user device by activating firstly the address user indicator line of said selected user device, and secondly the data user indicator line of said selected user device, and by sending address and data clock pulse signals on the address and data clock lines which respectively time the transfer of the address on the address bus and of the data on the bus, and a plurality of user interface means with one user interface control means being located in each user device in order to activate the memory request line of said user device to request a memory operation and being responsive to the active statuses of the address user indicator line and of the data user indicator line and to the address and data clock signals received from the memory interface control means through the address and data clock lines to control the memory addressing and the data transfers during the memory operation and activates the last operation lines during the last memory access.

2. A memory interface mechanism according to claim 1, characterized in that each user interface control means comprises:

means (40) for generating an active start of transfer signal when the user device requests a memory operation, user request generating means (82, 92) which are connected to the address and data user indicator lines and responsive to the active start of transfer signal and to the activated status of the address and data user indicator lines to activate the memory request line.

3. A memory interface mechanism according to claim 1 or claim 2 characterized in that it comprises:

at least one read/write control line (24), and write/read control means (52) located in each user interface control means which are responsive to the status of the address user indicator line to activate the read/write control line (24) so as to indicate to the memory controller that a read or write transfer is requested.

4. A memory interface mechanism according to claim 2 or 3 characterized in that the user interface control means comprises address generation and control means (46) which comprises:

address counting means which are loaded by the user device requesting a memory operation with a value equal to the starting address pointing to the memory address where the first access to the memory is to be performed and which are responsive to the activated status of the address indicator line and to the address clock pulse signal, so that the address counting means value is decremented when said address indicator line is active by each pulse of the address clock pulse signal and the address counting means value is provided on the address bus at each pulse of the address clock pulse signal;

address transfer counting means (54) which are loaded by the user device requesting a memory operation with the count of memory accesses which are needed to complete the memory operation and which are responsive to the activated status of the address user indicator line and to the address clock pulse signal to generate an end of address transfer signal when all the addresses have been sent on the address bus, said signal being provided to the request generating means to inhibit the activation of the request line during the address transfer.

5. A memory interface mechanism according to claim 4, characterized in that to user interface control means comprises data transfer control means (48) which are responsive to the activated status of the data user indicator line and to the data clock pulse signal to cause the user device to send or receive the data to/from the memory depending whether to write or read memory operation is requested and for generating an end of data transfer signal when all the data have been transferred between the memory and the user device, said signal being provided to the user request generating means to inhibit the activation of the request line during the data transfer.

6. A memory interface mechanism according to claim 5 characterized in that the address generation and control means comprises:

means (134) which are responsive to the value of the address tranfer counting means content to generate a last address transfer signal when it remains only one address to be provided on the address bus, and means (150, 154, 152, 148) which are responsive to the last address transfer signal to activate the last operation line.

7. Memory interface mechanism according to claim 6 characterized in that the user interface control means comprise checking means (158) which are responsive to the status to the address user indicator line, of the data user indicator line, of the end of address transfer line and of the end of data transfer line to generate an error signal to the user device when the address user indicator line or data user indicator line becomes inactive before the end of address transfer line or end of data transfer line becomes active.

8. Memory interface mechanism according to any one of claims 1, 2, 6 or 7 characterized in that the memory interface control means comprise:

user request selecting means (220, 238) having as many output lines as there are user devices and which are responsive to the status of the request lines to activate one of the output lines to indicate which user request is selected to be serviced at a given instant.

address user generation means (200, 238, 244) which are responsive to the status of the output lines of the user request selecting means to activate the address user indicator line of the user device whose request is selected, and data user generation means (200, 238, 246) which are responsive to the status of the output lines of the user request selecting means and to the last operation line to activate the data user indicator line whose request is selected.

9. A memory interface mechanism according to claim 8 characterized in that it comprises address clock generating means (200, 238, 248) which are responsive to the status of the request lines, of the read/write control line and of the last operation line to send the address clock pulse signal on the address clock line when at least one of the request lines is activated for the duration of the address transfer, so as to control the address bus use by the selected user device.

10. A memory interface mechanism according to claim 9 characterized in that it comprises data clock generating means (200, 238, 250) which are responsive to the status of the request lines, of the read/write control line and of the last operation line to send the data clock pulse signal on the address clock line when at least one of the request lines is activated for the duration of the data transfer, so as to control the data bus use by the selected user device.

* * * * *